(12) United States Patent
Sasaki

(10) Patent No.: US 6,678,942 B1
(45) Date of Patent: Jan. 20, 2004

(54) THIN FILM MAGNETIC HEAD AND METHOD OF MANUFACTURING THE SAME

(75) Inventor: Yoshitaka Sasaki, Yokohama (JP)

(73) Assignee: TDK Corporation, Tokyo (JP)

( * ) Notice: Subject to any disclaimer, the term of this patent is extended or adjusted under 35 U.S.C. 154(b) by 159 days.

(21) Appl. No.: 09/704,664

(22) Filed: Nov. 3, 2000

Related U.S. Application Data

(62) Division of application No. 09/116,998, filed on Jul. 17, 1998, now Pat. No. 6,191,916.

(30) Foreign Application Priority Data

Mar. 30, 1998 (JP) ............................................. 10-84337

(51) Int. Cl.⁷ ........................... G11B 5/127; G11B 5/17; H04R 31/00
(52) U.S. Cl. ................ 29/603.25; 29/603.14; 29/603.15; 29/603.27; 360/123
(58) Field of Search ........................ 29/603.14, 603.25, 29/603.15, 603.07, 603.13, 603.27, 603.18, 603.22, 603.24; 360/123, 125, 126

(56) References Cited

U.S. PATENT DOCUMENTS 4,416,056 A * 11/1983 Takahashi ................. 29/603.24
5,113,300 A 5/1992 Ikeda et al.
5,673,474 A * 10/1997 Watterston et al. ...... 29/603.14
5,856,898 A 1/1999 Ohashi
6,226,860 B1 * 5/2001 Burbank .................. 29/603.14

FOREIGN PATENT DOCUMENTS

| JP | 54-81818 | 6/1979 |
| JP | 55-41012 | 10/1980 |
| JP | Sho 55-41012 | 10/1980 |
| JP | 62-256209 | 11/1987 |
| JP | 1-220114 | 9/1989 |
| JP | 11-259813 | 9/1999 |

* cited by examiner

*Primary Examiner*—Carl J. Arbes
*Assistant Examiner*—T. Phan
(74) *Attorney, Agent, or Firm*—Oliff & Berridge, PLC

(57) ABSTRACT

A method of manufacturing the same in an accurate and stable manner, in which a magnetic path length of a thin film coil is shortened by decrease a distance between adjacent coil windings of at least one layer thin film coil. On a first magnetic layer 37, is formed an insulating layer 38, and then a first thin film coil half 40 is formed on the surface of the insulating layer such that a distance between successive coil windings is large. Then, a second thin film coil half 44 is formed such that its coil windings situate between successive coil windings of the first thin film coil half. First and second coil halves 47 and 48 of a second layer thin film coil are formed on the first layer thin film coil in a similar manner. After forming an insulating layer 52, a second magnetic layer 53 and overcoat layer 54 are formed.

12 Claims, 17 Drawing Sheets

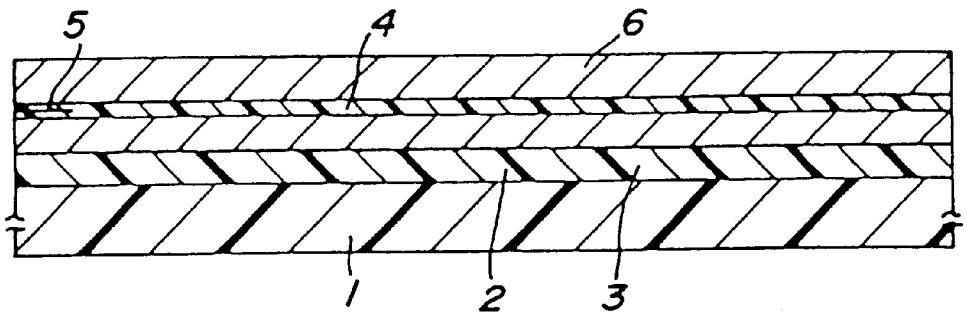
FIG_1 PRIOR ART
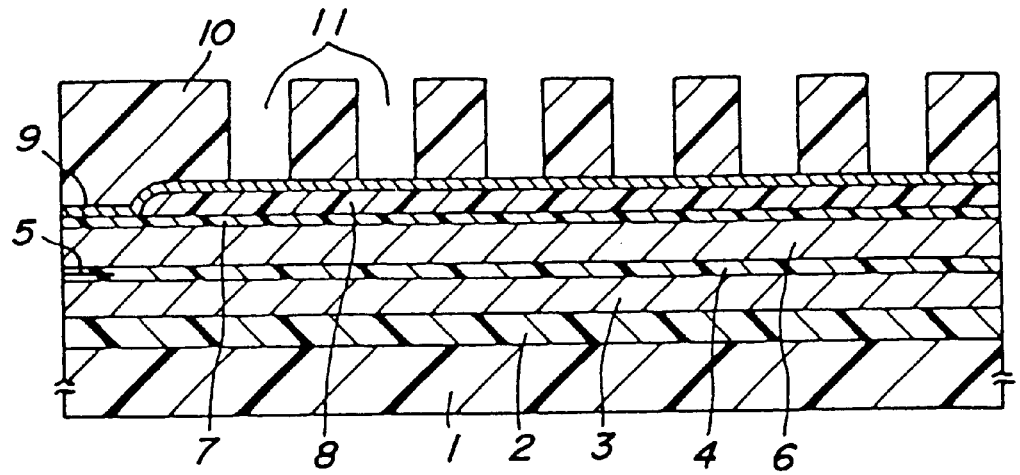
FIG_2 PRIOR ART
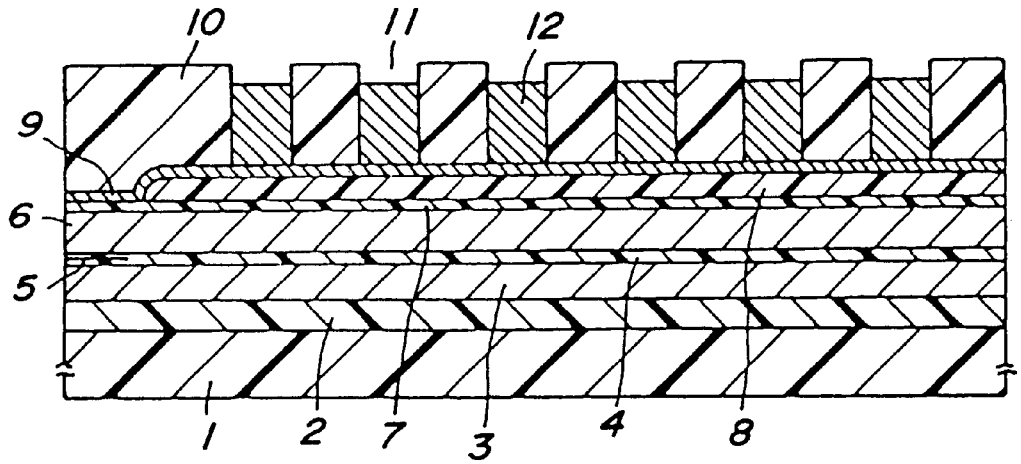
FIG_3 PRIOR ART

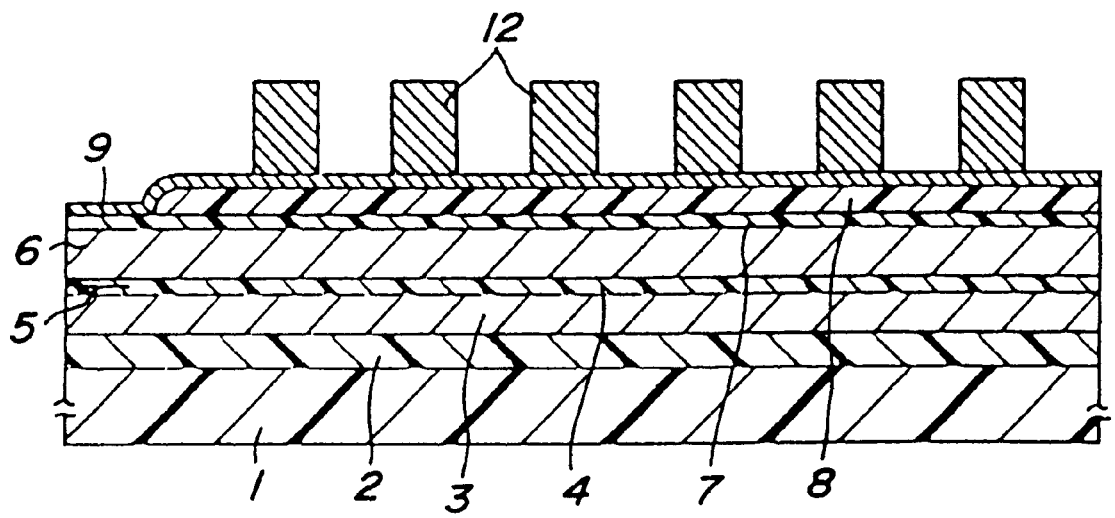
FIG_4 PRIOR ART
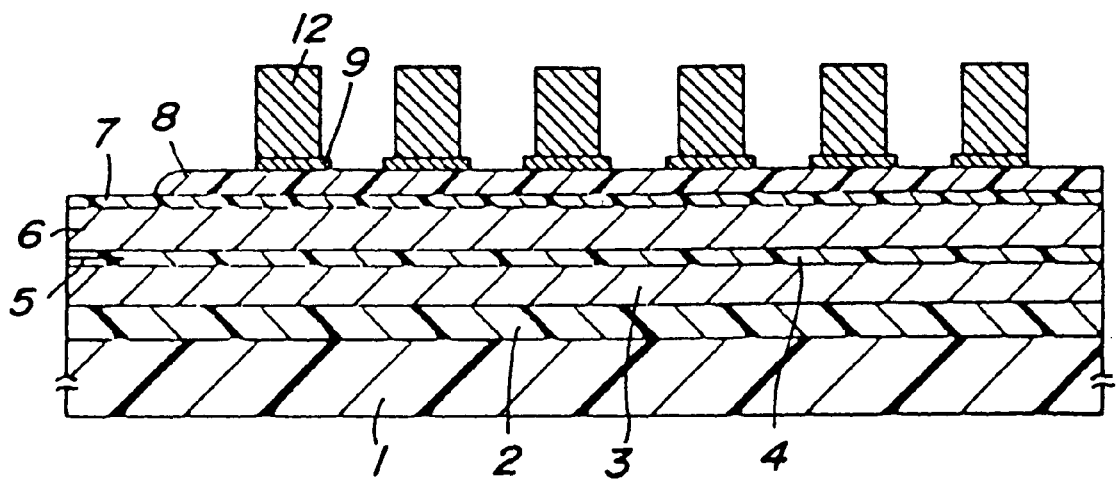
FIG_5 PRIOR ART

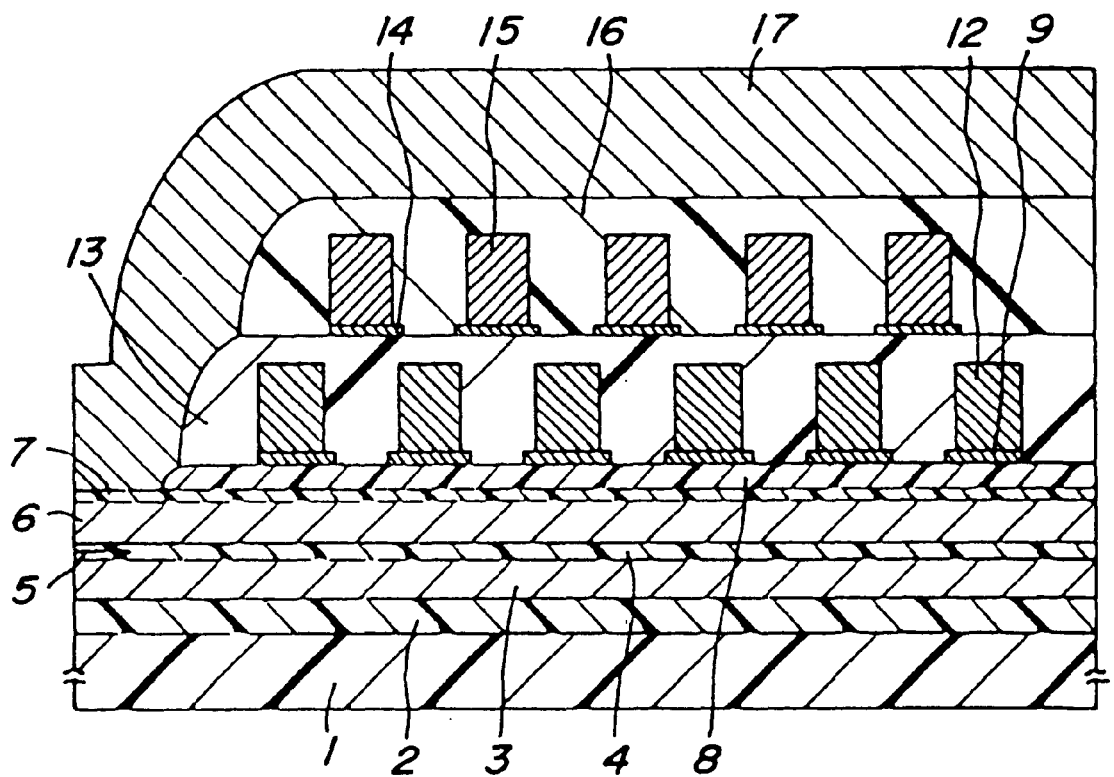
FIG_6
PRIOR ART

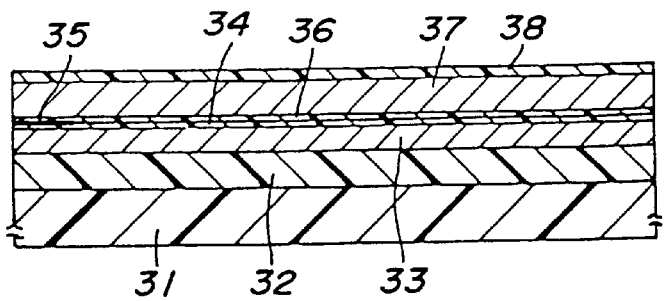
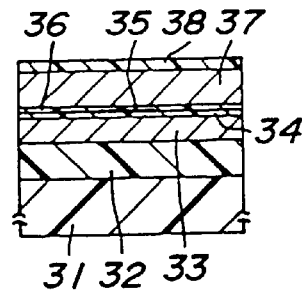
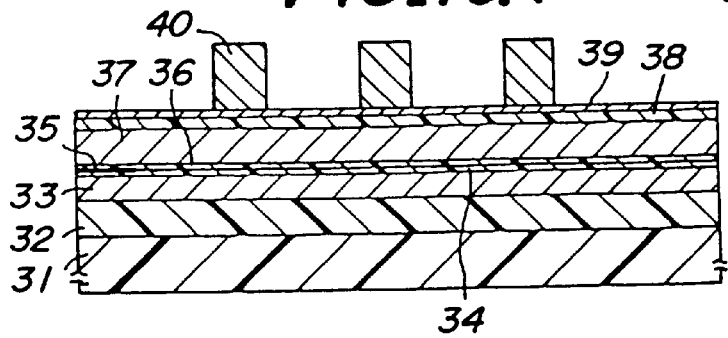
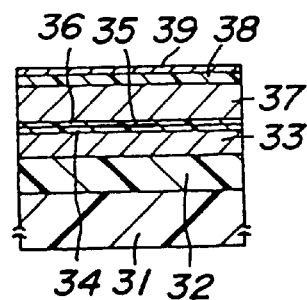
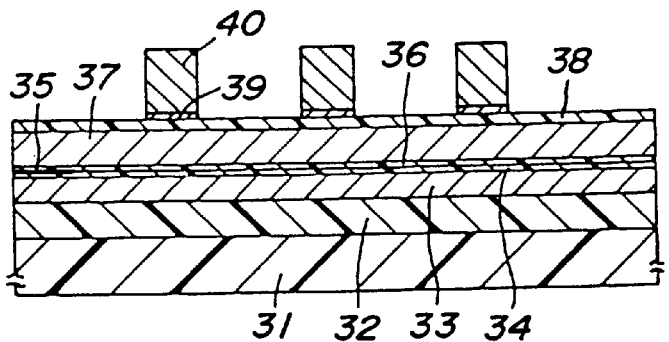
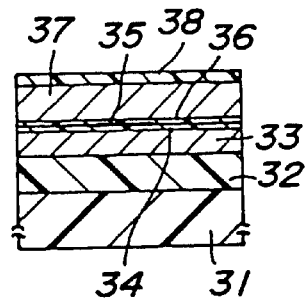
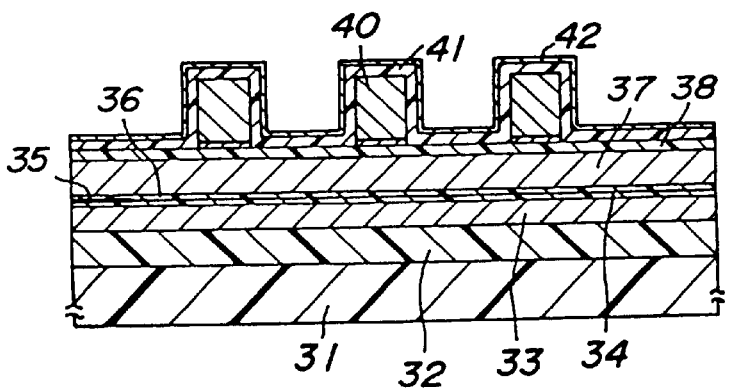
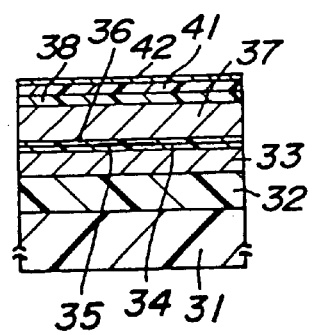

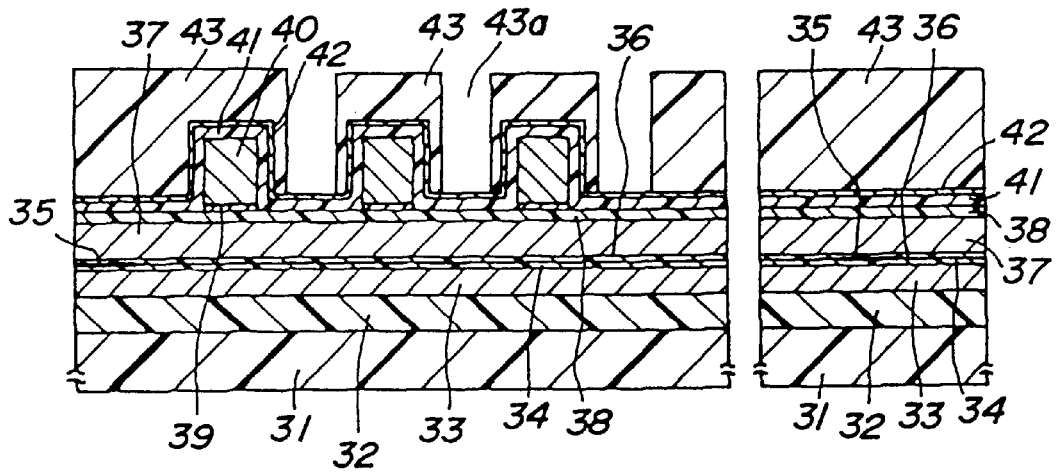
FIG_13A  FIG_13B
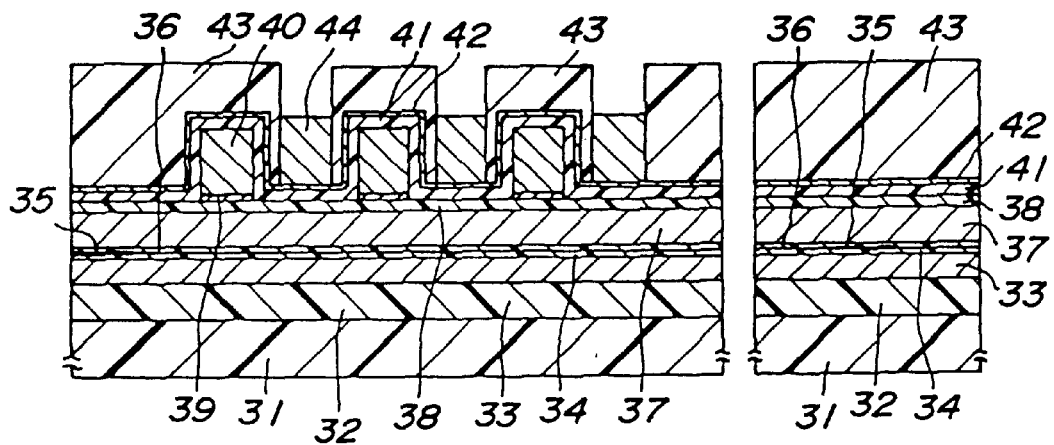
FIG_14A  FIG_14B
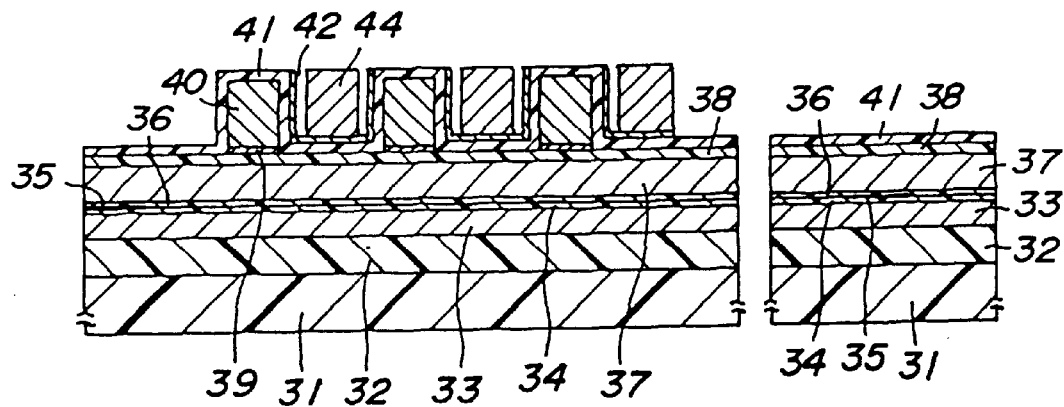
FIG_15A  FIG_15B

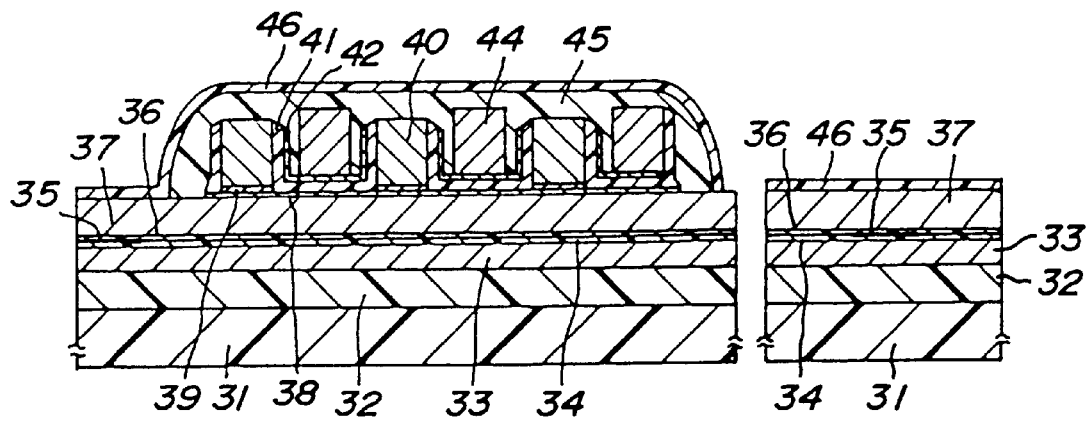
FIG_16A  FIG_16B
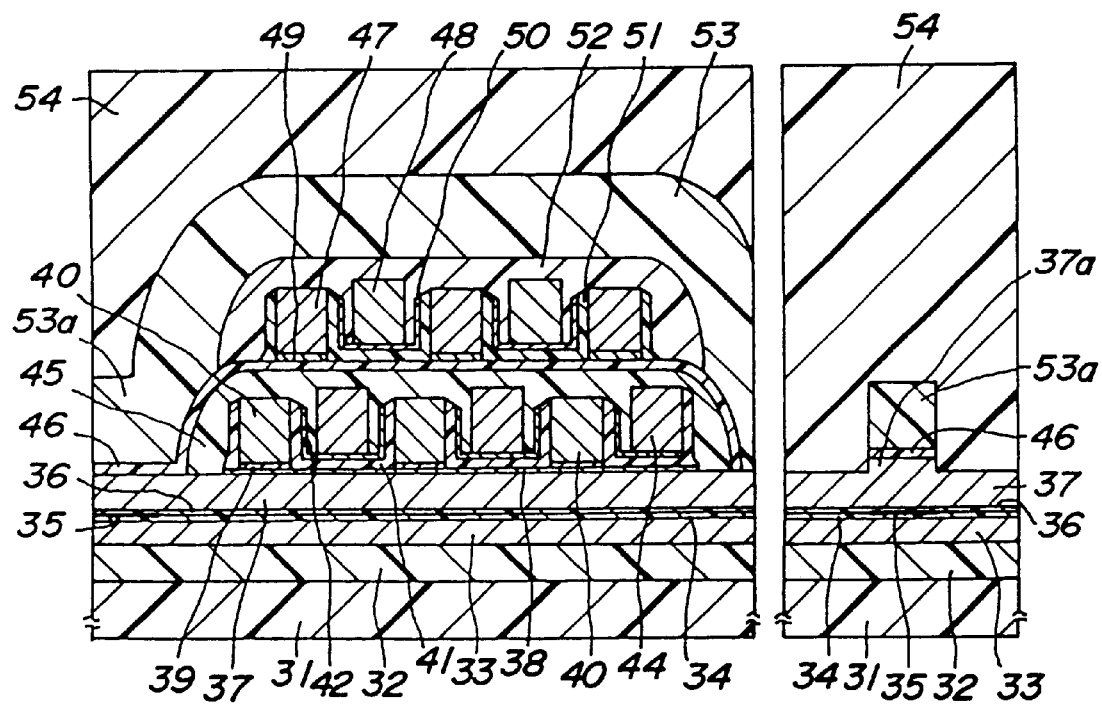
FIG_17A  FIG_17B

FIG_18
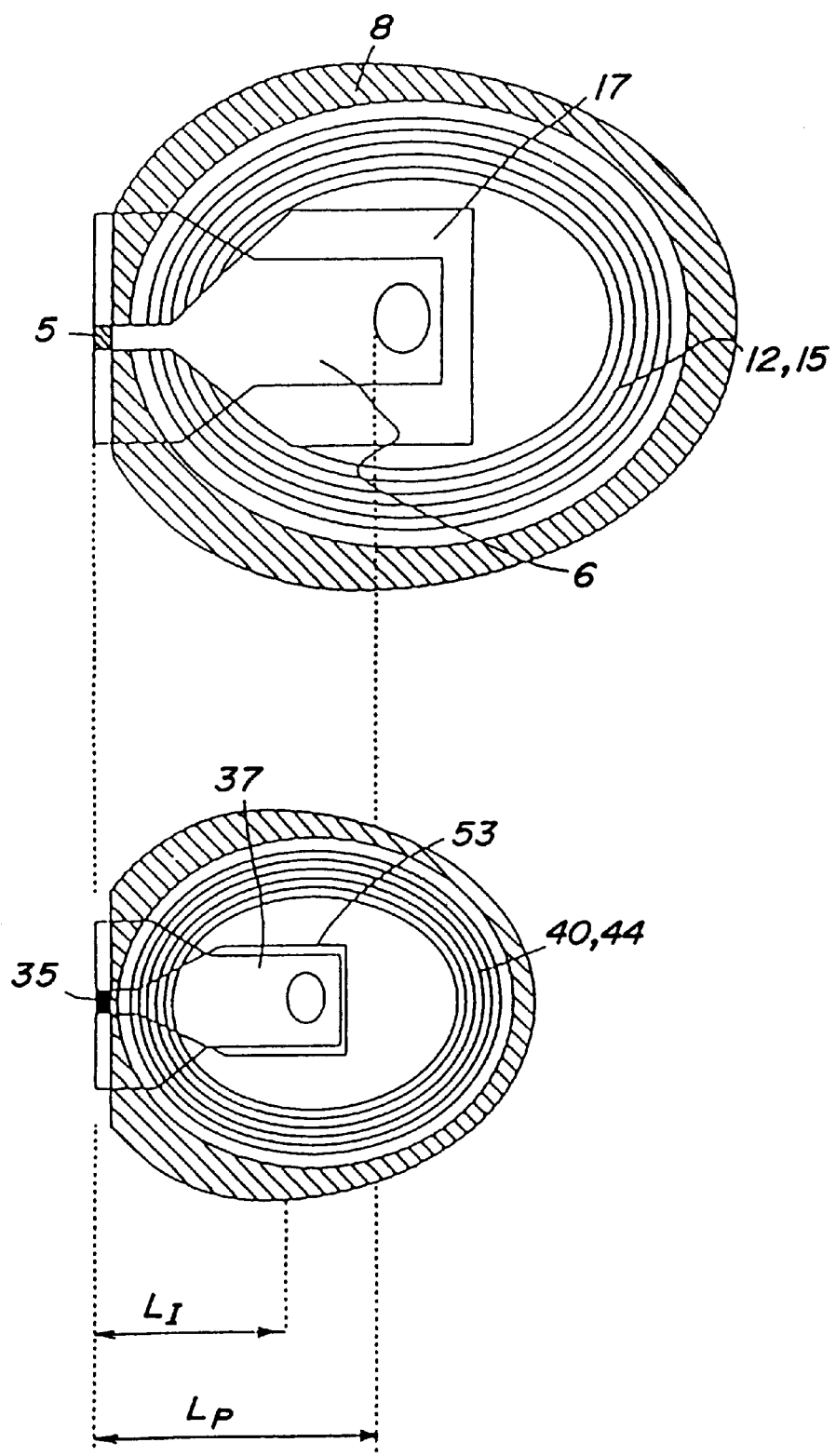

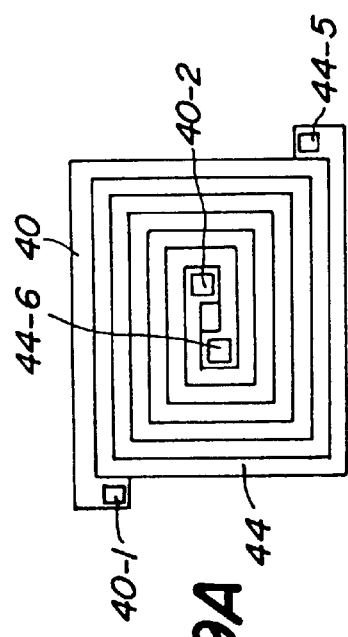
FIG._19A
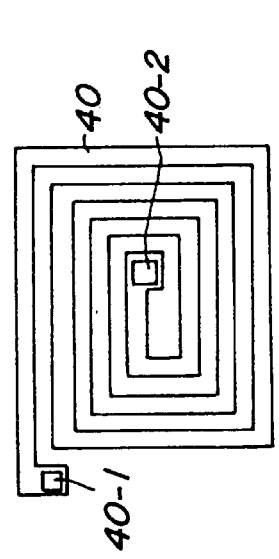
FIG._19B
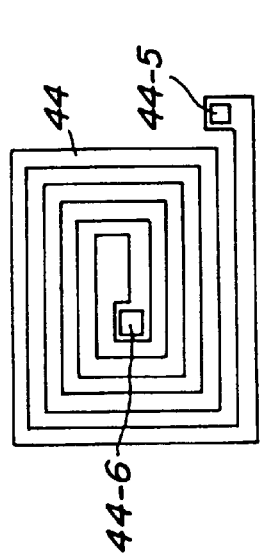
FIG._19C
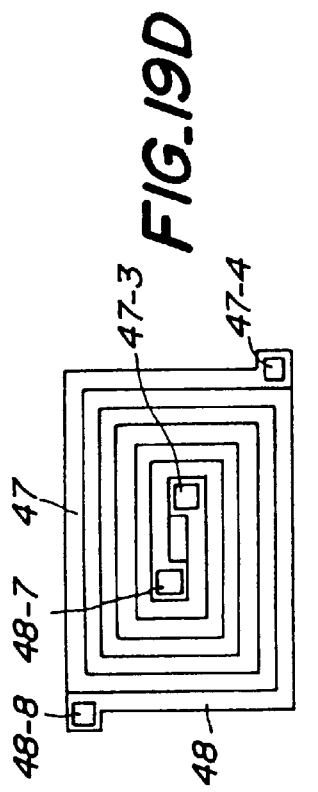
FIG._19D
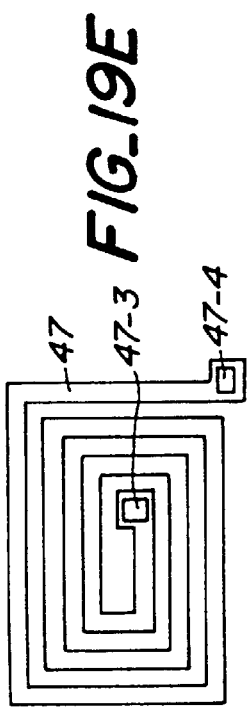
FIG._19E
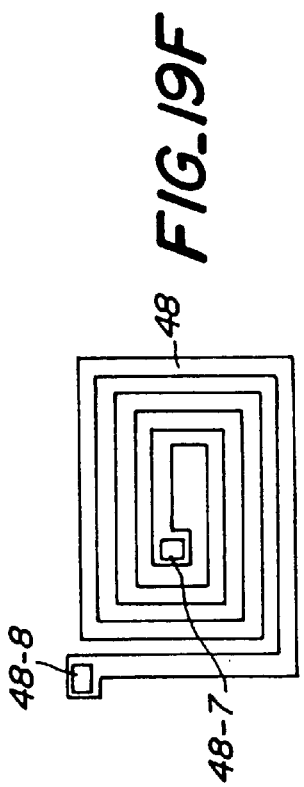
FIG._19F

FIG_20A
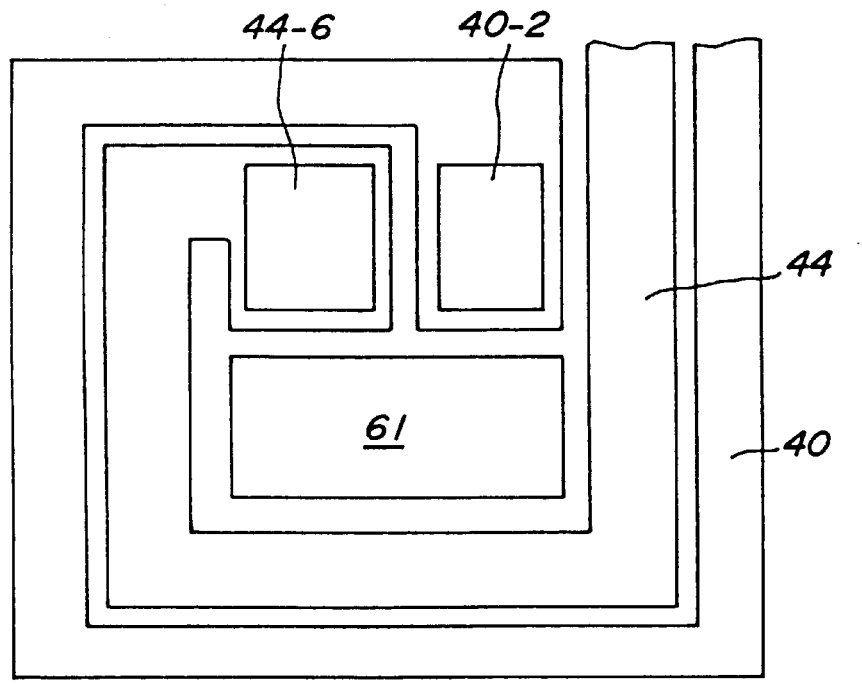
FIG_20B
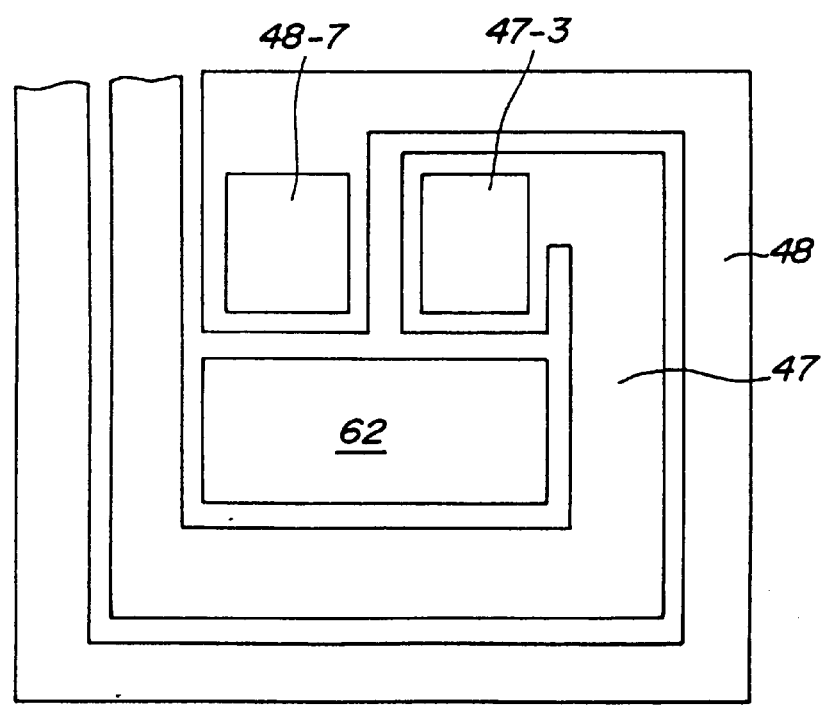

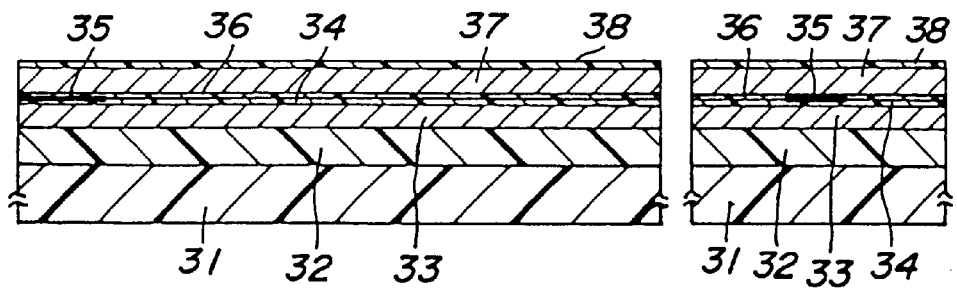
FIG._21A  FIG._21B
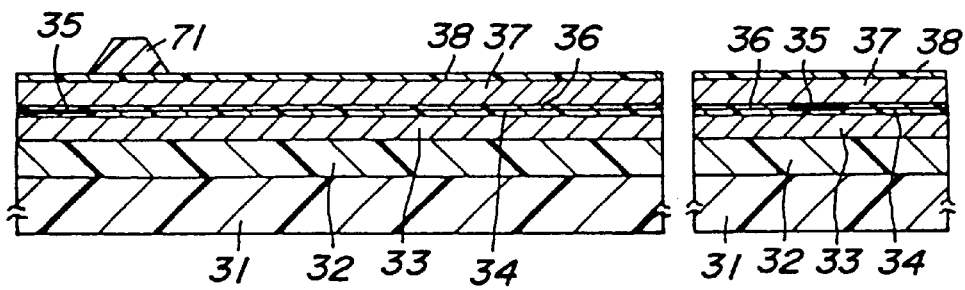
FIG._22A  FIG._22B
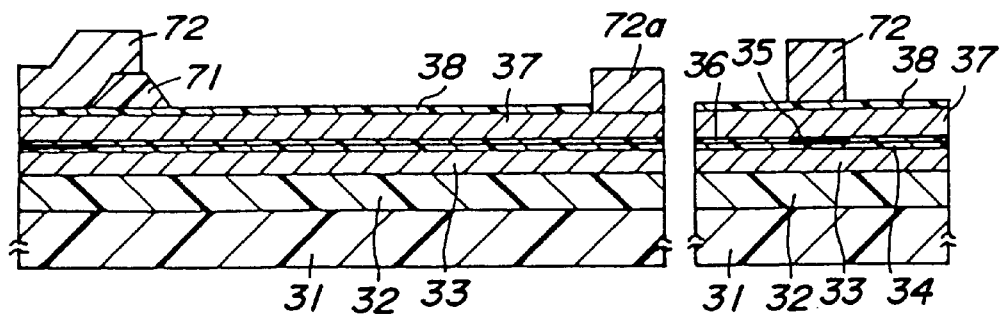
FIG._23A  FIG._23B
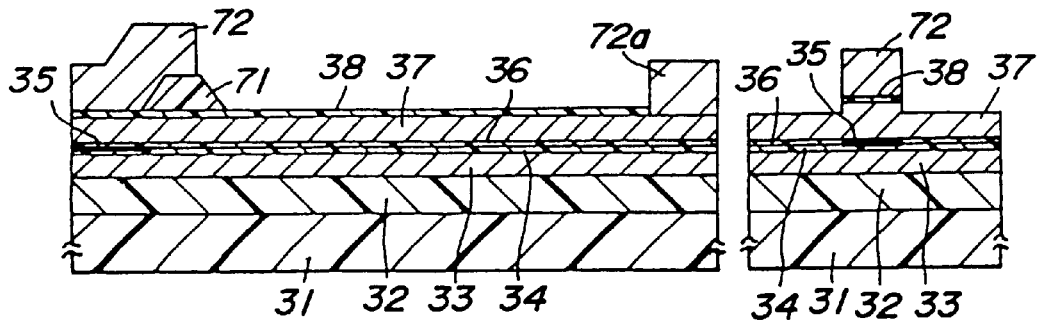
FIG._24A  FIG._24B

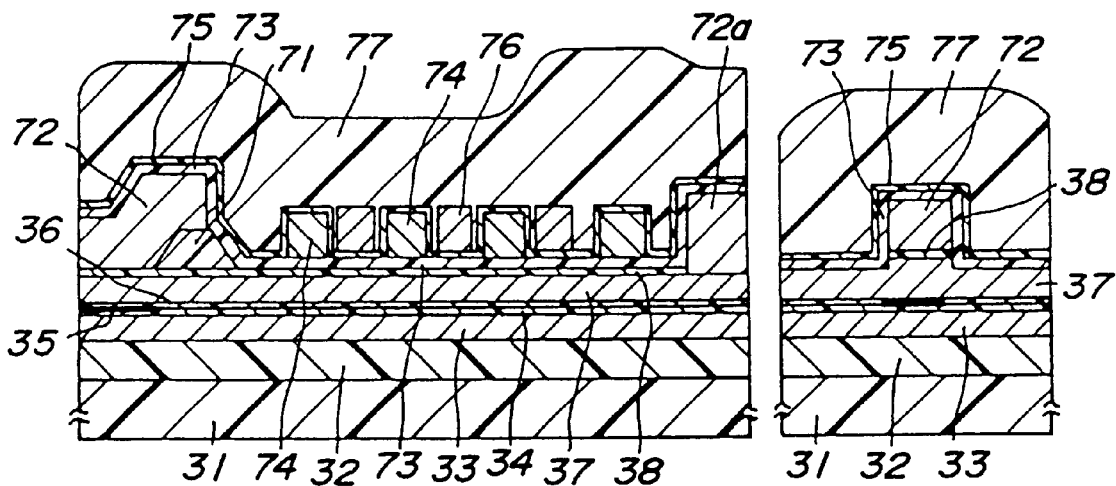
FIG_28A  FIG_28B
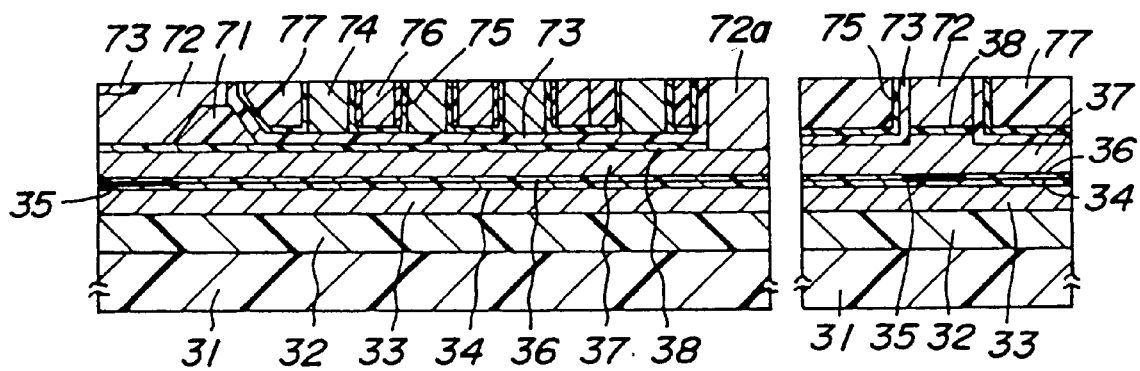
FIG_29A  FIG_29B
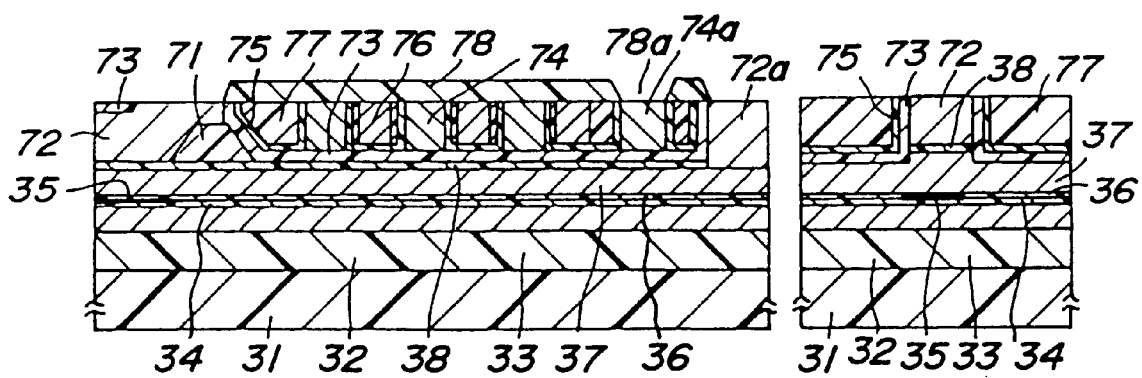
FIG_30A  FIG_30B

FIG_34A
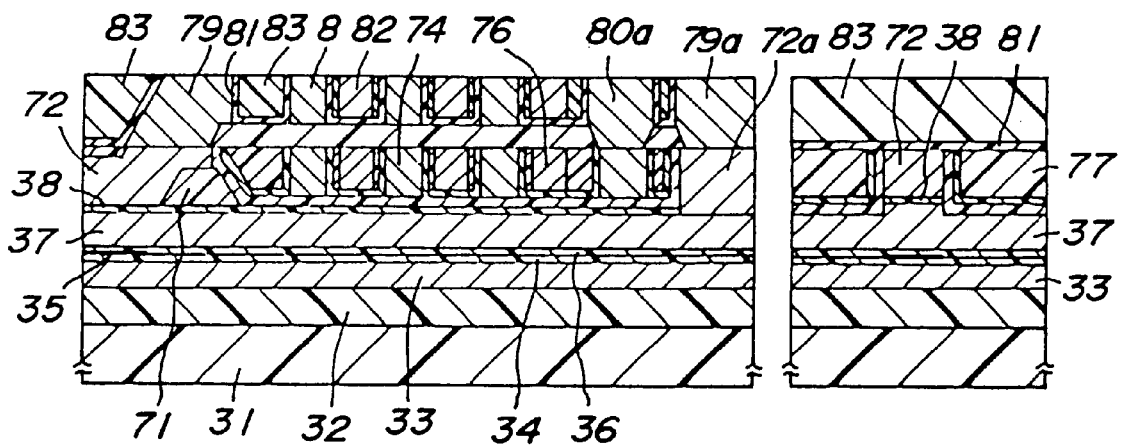
FIG_34B
FIG_35A
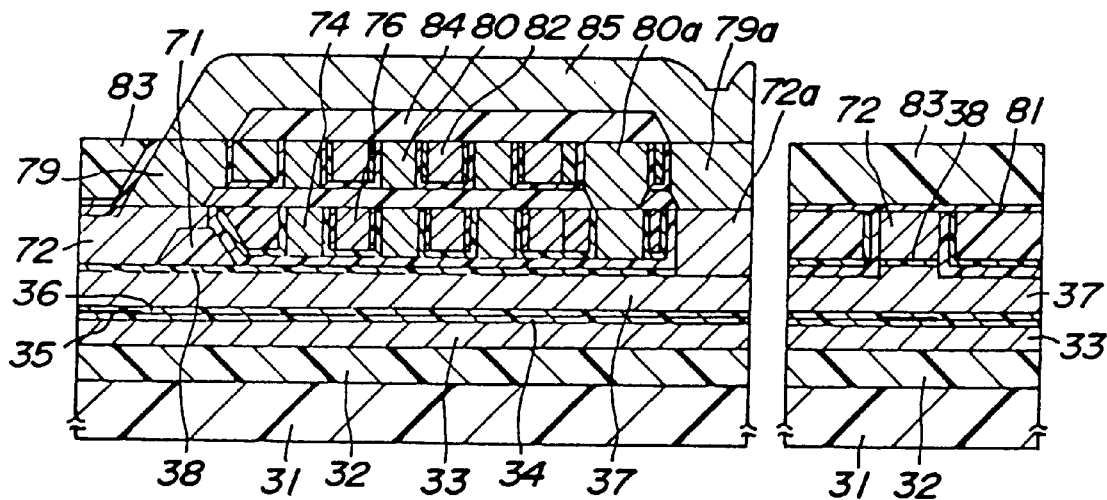
FIG_35B

THIN FILM MAGNETIC HEAD AND METHOD OF MANUFACTURING THE SAME

CROSS REFERENCE TO RELATED DOCUMENT

The present application is a division of application Ser. No. 09/116,998, now U.S. Pat. No. 6,191,916 B1 which was filed on Jul. 17, 1998.

BACKGROUND OF THE INVENTION

1. Field of the Invention

The present invention relates to a thin film magnetic head and a method of manufacturing the same, particularly to an inductive type writing magnetic transducing element and a method of manufacturing the same.

2. Description of the Related Art

Recently a surface recording density of a hard disc device has been improved, and it has been required to develop a thin film magnetic head having an improved performance accordingly. A hybrid or composite or combination type thin film magnetic head is constructed by stacking, on a substrate, an inductive type thin film magnetic head intended for writing and a magnetoresistive type thin film magnetic head intended for reading, and has been practically used. In general, as a reading magnetoresistive element, an element utilizing anisotropic magnetoresistive (AMR) effect has been used so far, but there has been further developed a GMR reproducing element utilizing a giant magnetoresistive (GMR) effect having a resistance change ratio higher than that of the normal anisotropic magnetoresistive effect by several times. In the present specification, elements exhibiting a magnetoresistive effect such as AMR and GMR reproducing elements are termed as a magnetoresistive reproducing element or MR reproducing element.

By using the AMR reproducing element, a very high surface recording density of several gigabits/inch$^2$ has been realized, and a surface recording density can be further increased by using the GMR element. By increasing a surface recording density in this manner, it is possible to realize a hard disc device which has a very large storage capacity of more than 10 gigabytes.

A height (MR Height: MRH) of a magnetoresistive reproducing element is one of factors which determine a performance of a reproducing head including a magnetoresistive reproducing element. The MR height MRH is a distance measured from an air bearing surface on which one edge of the magnetoresistive reproducing element is exposed to the other edge of the element remote from the air bearing surface. During a manufacturing process of the magnetic head, a desired MR height MRH can be obtained by controlling an amount of polishing the air bearing surface.

At the same time, the performance of the recording magnetic head is also required to be improved in accordance with the improvement of the performance of the reproducing magnetic head. In order to increase a surface recording density, it is necessary to make a track density on a magnetic record medium as high as possible. For this purpose, a width of a write gap at the air bearing surface has to be reduced to a value within a range from several micron meters to several sub-micron meters. In order to satisfy such a requirement, the semiconductor manufacturing process has been adopted for manufacturing the thin film magnetic head.

One of factors determining the performance of the inductive type thin film writing magnetic head is a throat height (TH). This throat height is a distance of a pole portion measured from the air bearing surface to an edge of an insulating layer which serves to separate a thin film coil from the air bearing surface. It has been required to shorten this distance as small as possible. The reduction of this throat height is also decided by an amount of polishing the air bearing surface.

In order to improve the performance of the inductive type thin film writing magnetic head, there has been proposed to reduce a length of portions of the bottom pole and top pole surrounding the thin film coil (in the present specification, said length is termed as magnetic path length).

FIGS. 1–8 show successive steps for manufacturing a conventional typical inductive type thin film magnetic head, these drawings showing a cross-sectional view cut along a line perpendicular to the air bearing surface. It should be noted that in this combination type thin film magnetic head, the inductive type thin film magnetic head for writing is stacked on the reproducing MR element.

First of all, as shown in FIG. 1, an insulating layer 2 consisting of, for example alumina ($Al_2O_3$) and having a thickness of about 5–10 μm is deposited on a substance 1 made of a non-magnetic and electrically insulating material such as aluminum-titanium-carbon (AlTiC). A bottom shield layer 3 constituting a magnetic shield which protects the GMR reproducting element of the reproducing head from the influence of an external magnetic field, is formed with a thickness of 3–4 μm. Next, a GMR layer 5 having a thickness of several tens nano meters is formed on the bottom shield such that the GMR layer is embedded in a shield gap layer 4. Then, a magnetic layer 6 made of a permalloy is formed with a film thickness of 3–4 μm. This magnetic layer 6 has not only the function of the upper shield layer which magnetically shields the GMR reproducing element together with the above described lower shield layer 3, but also has the function of a bottom pole of the writing thin film magnetic head. Here, for sake of explanation, the magnetic layer 6 is called a first magnetic layer by taking into account the fact that this magnetic layer constitutes one of the poles of the writing magnetic head.

Then, as shown in FIG. 2, a write gap layer 7 made of a non-magnetic material such as alumina and having a thickness of about 200 nm is formed on the first magnetic layer 6. A photoresist 8 is formed on the write gap layer 7 at an area except for a potion corresponding to the pole portion to be formed later, said photoresist determining a reference position for the throat height. Next, a thin copper layer 9 having a thickness of about 100 nm is formed on a whole surface by sputtering. Thin copper layer 9 constitutes a seed layer for the formation of the thin film coil by electroplating. Therefore, this layer is also called a seed layer. On the seed layer 9, is formed a thick photoresist 10 having a thickness of 3 μm, and an opening 11 is formed within the photoresist 10 such that the seed layer is exposed at the bottom of the opening. A height of this opening is equal to a thickness of the photoresist and is 2 μm, and a width of the opening is also 2 μm.

Next, an electroplating of copper is performed using a plating bath consisting of a copper sulfate to form first layer thin film coil windings 12 having a thickness of 2–3 μm within the opening 11 formed in the photoresist 10 as depicted in FIG. 3. It is preferable that a thickness of the coil winding 12 is smaller than a depth of the opening 11.

Then, as illustrated in FIG. 4, after removing the photoresist 10, a milling with an argon ion beam is carried out to remove the seed layer 9 as shown in FIG. 5 to separate the successive coil windings 12 to form a single coiled conductor. During this ion beam milling, in order that the seed layer 9 at roots of the coil windings 12 of the thin film coil is not remained, the ion beam milling is performed at an angle of 5–10°. In this manner, by conducting the ion beam milling substantially at right angles, debris of the material of the seed layer 9 are liable to be adhered to the coil windings 12. Therefore, it is necessary to increase a distance between successive coil windings.

Next, as depicted in FIG. 6, a photoresist 13 is formed to cover the coil windings 12 of the first layer thin film coil, and after polishing the top surface thereof into a flat surface, coil windings 15 of a second layer thin film coil are formed on a seed layer 14 by a similar method as that described above. Furthermore, after forming a photoresist 16, a second magnetic layer 17 made of a permalloy and having a thickness of 3–5 μm is formed, said second magnetic layer constituting the top pole.

Then, as shown in FIGS. 7 and 8, parts of the write gap layer 7 and first magnetic layer 6 are etched while a pole portion 17a of the second magnetic layer 17 is used as a mask, to form a trim structure. Furthermore, an overcoat layer 18 made of an alumina is formed on a whole surface. It should be noted that FIG. 8 is a cross sectional view cut along a line 8—8 in FIG. 7, and first and second shield gap layers 4a and 4b constituting the shield gap layer 4 which electrically isolates and magnetically shields the GMR element 5 are also shown together with conductive layers 5a and 5b constituting the electric connection to the GMR element.

In an actual method of manufacturing the thin film magnetic head, after forming a large number of the above mentioned structures in a single wafer, the wafer is divided into bars in each of which a number of thin film magnetic heads are aligned, and a side wall of a bar is polished to obtain an air bearing surface 19 (refer to FIG. 7). During the formation of the air bearing surface 19, the GMR layer 5 is also polished, and a combination type thin film magnetic head having a desired throat height and MR height can be obtained. Furthermore, in an actual thin film magnetic head, electric conductors and contact pads for performing the electrical connection to the thin film coils 12, 15 and MR reproduction element are formed, but they are not shown in the drawings.

As shown in FIG. 7, an angle θ (apex Angle) between a line S connecting side corners of the photoresist layers 11,13,15 for isolating the thin film coils 12,14 and the upper surface of the third magnetic layers 16 is an important factor for determining the performance of the thin film magnetic head together with the above described throat height TH and MR height.

Moreover, as shown in FIG. 8, a width W of a pole portion 6a of the trim structure and the pole portion 17a of the second magnetic layer 17 determines a width of tracks formed on a magnetic record medium. Therefore, in order to realize a higher surface recording density, this width W has to be thin as small as possible.

In the conventional combination type thin film magnetic head manufactured in the manner explained above, there is a problem particularly in a point of a miniaturization of the inductive type recording thin film magnetic head. It has been known that characteristics of the inductive type thin film magnetic head such as magnetic flux rising time, non-linear transition shift (NLTS) and over-write property can be improved by decreasing a magnetic path length $L_M$ which is a length of portions of the first and second magnetic layers 6 and 17 which surround the coil windings 12, 15 of the thin film coil. In order to reduce this magnetic path length $L_M$, it is necessary to reduce a coil width $L_C$ of portions of the coil windings 12, 15 surrounded by the first and second magnetic layers 6 and 17. However, as will be explained hereinafter, in the known thin film magnetic head, said coil width $L_C$ could not be shortened.

In order to reduce the coil width $L_C$ of the inductive type thin film magnetic head, it is necessary to reduce a width of respective coil windings of the thin film coil as well as a distance between successive coil windings. However, a reduction in a width of the coil windings is limited by a fact that the thin film coil should have a low resistance. That is to say, in order to reduce the resistance of the thin film coil, the thin film coil is made of a copper having a high electric conductivity, but since a height of the thin film coil is limited to 2–3 μm, a width of the coil windings could not be smaller than 1.5 μm. Therefore, in order to reduce the coil width $L_C$, it is necessary to reduce a distance between successive coil windings.

However, in the known thin film magnetic head, the distance between successive coil windings 12, 15 could not be reduced. Now reasons thereof will be explained.

As stated above, the coil windings 12, 15 of the thin film coil are formed by the electroplating of a copper. In this case, in order to deposit a copper within the openings 11 uniformly over a whole wafer surface, the seed layer 9 having a thickness of 100 nm is formed, and after forming the coil windings 12, 15 by depositing a copper selectively within the openings 11 at which the seed layer 9 is exposed by electroplating, the seed layer 9 is selectively removed in order to separate successive coil windings from each other. This removal of the seed layer 9 is carried out by the ion beam milling using, for instance an argon ion beam, while the coil windings 12, 15 are used as a mask.

Here, in order to remove the seed layer 9 between successive coil windings 12, 15 sufficiently, it is preferable to perform the ion beam milling at right angles to the surface of the substrate. However, then debris of etched copper might be adhered to the coil windings and the electrical isolation between successive coil windings might be broken. Therefore, a distance between successive coil windings could not be narrowed.

In order to mitigate the above problem, the ion beam milling may be performed with an angle of 5–10°. Then, a portion behind the photoresist 10 could not be sufficiently irradiated with the ion beam and the seed layer 9 might be remained partially. Therefore, in order to avoid the breakage of the electrical isolation between successive coil windings 12, 15, a distance between successive coil windings could not be small. In the conventional thin film magnetic head, a distance between successive coil windings has to be long such as 2–3 μm and could not be made narrower than this value.

When the thin film coil 12, 15 is formed by the electroplating as stated above, it is necessary to stir the plating bath such as a copper sulfate in order to attain a uniform thickness of the thin film coil. When a width of walls defining the openings 11 formed in the photoresist 10 is thinned, the thin walls might be destroyed by stirring the electrolytic solution and the thin film coil could be no more formed accurately. In this manner, in the known thin film magnetic head, a distance between successive coil windings could not be reduced.

Moreover, in the known thin film magnetic head, the photoresist 8 is formed such that the reference position of the throat height, i.e. a throat height zero position is defined by the photoresist. After forming the first layer thin film coil 12, the photoresist 8 is also etched during the etching process for removing the seed layer 9 and an edge of the photoresist 8 is retarded. Therefore, in a completed thin film magnetic head, it is impossible to obtain the throat height having a desired value. This is one of factors which decrease a manufacturing yield of the thin film magnetic head.

In order to improve NLTS property of the inductive type thin film magnetic head, the number of coil windings of the thin film coil may be increased. However, for this purpose, the number of thin film coil layers has to be increased such as four or five layers. Then, the apex angle might be increased and a narrow track width could not be attained any more. In order to keep the apex angle within a given range, it is desired to limit the number of thin film coil layers to be not larger than three, preferably not larger than two. Then, the number of the coil windings could not be increased, and therefore NLTS property could not be improved.

SUMMARY OF THE INVENTION

It is an object of the present invention to provide an inductive type thin film magnetic head, in which the above mentioned problems can be solved by narrowing a width $L_C$ of the thin film coil by reducing a spacing between successive coil windings of the coil and a magnetic path length $L_M$ can be decreased, and to provide a method of manufacturing such a thin film coil in an easy and accurate manner.

According to the invention, a thin film magnetic head comprises:

a first magnetic layer having a pole portion which is to be opposed to a magnetic record medium;

a second magnetic layer having a pole portion which constitutes an air bearing surface together with said pole portion of the first magnetic layer, and being magnetically coupled with said first magnetic layer at a position remote from said air bearing surface;

a gap layer made of a non-magnetic material and inserted between said pole portion of the first magnetic layer and said pole portion of the second magnetic layer at least at said air bearing surface;

a thin film coil means including one or more layer thin film coils and having a portion which is arranged between said first and second magnetic layers by means of an insulating layer; and a substrate supporting said first and second magnetic layers, gap layer, insulating layer and thin film coils;

wherein at least one layer thin film coil among said one or more layer thin film coils includes first and second thin film coil halves whose coil windings are alternately arranged with interposing an insulating layer therebetween and said first and second thin film coil halves are connected to each other such that an electric current flows therethrough in a same direction.

In a preferable embodiment of the thin film magnetic head according to the invention, said thin film coil means includes a first layer thin film coil and a second layer thin film coil, and each of said first and second layer thin film coils has first and second thin film coil halves having coil windings which are alternately arranged with interposing an insulating layer therebetween. Each of said first and second thin film coil halves includes a first end from which a winding starts and a second end at which the winding ends viewed in a winding direction in which a winding radius is gradually increased or decreased. The second end of the first thin film coil half of the first layer thin film coil is connected to the second end of the first thin film coil half of the second layer thin film coil, the first end of the first thin film coil half of the second layer thin film coil is connected to the first end of the second thin film coil half of the first layer thin film coil, the second end of the second thin film coil half of the first layer thin film coil is connected tot he second end of the second thin film coil half of the second layer thin film coil, and the second end of the first thin film coil half of the first layer thin film coil and first end of the second thin film coil half of the second layer thin film coil are connected to first and second leads, respectively to be connected to an electric current supply source.

In such a thin film magnetic head according to the invention, each of the first and second layer thin film coils is formed by the first and second thin film coil halves, and a distance between successive coil windings of the first thin film coil half is slightly larger than a width of the coil winding. Therefore, the second thin film coil half can be arranged between successive coil windings of the first thin film coil half with interposing the insulating layer therebetween, and a distance between successive coil windings of the first and second thin film coil halves can be reduced materially. Therefore, the magnetic path length can be reduced, and thus the magnetic flux rising time, NLTS and over-write properties can be improved.

In the thin film magnetic head according to the invention, it is preferable that a distance between adjacent coil windings of the first and second thin film coil halves is set to be not longer than 1 $\mu$m, particularly to 0.3–0.5 $\mu$m. If a distance between successive coil windings is made smaller than 0.3 $\mu$m, the isolation between adjacent coil windings might be broken. If a distance between adjacent coil windings is set to be larger than 0.5 $\mu$m, the reduction in the magnetic path length could not be attained sufficiently. According to the invention, by reducing a distance between adjacent coil windings into 0.3–0.5 $\mu$m as stated above, the magnetic path length can be reduced to about 50–70% of that of the conventional thin film magnetic head, and the performance of the inductive type thin film magnetic head can be materially improved.

According to the invention, a method of manufacturing a thin film magnetic head including;

a first magnetic layer having a pole portion which is to be opposed to a magnetic record medium;

a second magnetic layer having a pole portion which constitutes an air bearing surface together with said pole portion of the first magnetic layer, and being magnetically coupled with said first magnetic layer at a position remote from said air bearing surface;

a gap layer made of a non-magnetic material and inserted between said pole portion of the first magnetic layer and said pole portion of the second magnetic layer at least at said air bearing surface;

a thin film coil means formed by one or more layer thin film coils and having a portion which is arranged between said first and second magnetic layers by means of an insulating layer; and a substrate supporting said first and second magnetic layers, gap layer, insulating layer and thin film coils;

wherein a step of forming at least first and second thin film coils comprises:

the step of forming a first insulating layer such that the insulating layer is supported by said substrate;

the step of forming a first thin film coil half of the first layer thin film coil on a surface of said insulating layer into a coil fashion such that adjacent coil windings are separated from each other by a distance which is larger than a width of coil windings;

the step of forming a second thin film coil half in a coil fashion such that coil windings of the second thin film coil half are placed within spaces formed between successive coil windings of said first thin film coil half with interposing a second insulating layer between these coil windings;

the step of forming a third insulating layer over said first and second thin film coil halves;

the step of forming a first thin film coil half of the second layer thin film coil on a surface of said third insulating layer into a coil fashion such that adjacent coil windings are separated from each other by a distance which is larger than a width of coil windings, connecting an inner or outer end of said first thin film coil half of the second layer thin film coil to an inner or outer end of said first thin film coil half of said first layer thin film coil, and connecting an outer or inner end of said first thin film coil half of the second layer thin film coil to an outer or inner end of the second thin film coil half of the first layer thin film coil;

the step of forming a second thin film coil half in a coil fashion such that coil windings of the second thin film coil half are placed within spaces formed between successive coil windings of said first thin film coil half with interposing a fourth insulating layer between these coil windings, and connecting an inner or outer end of the second thin film coil half of the second layer thin film coil to an inner or outer end of the second thin film coil half of the first layer thin film coil;

the step of forming a fifth insulating layer over said first and second thin film coil halves of the second layer thin film coil; and the step of forming first and second leads connected respectively to an outer or inner end of the first thin film coil half of the first layer thin film coil and to an outer or inner end of said second thin film coil half of the second layer thin film coil.

In a preferable embodiment of the method according to the invention, said first and second thin film coil halves of the first and/or second layer thin film coils are formed by carrying out;

the step of forming a first seed layer on said first insulating layer;

the step of forming the first tin film coil half on said first seed layer by an electroplating;

the step of removing a portion of said first seed layer which is not covered with the first thin film coil half;

the step of forming an insulating layer over said first thin film coil half;

the step of forming a second seed layer on said insulating layer;

the step of forming an insulating layer over coil windings of said first thin film coil half;

the step of forming the second thin film coil half by electroplating on a portion of said second seed layer which is not covered with the insulating layer covering the coil windings of the first thin film coil half; and the step of selectively removing a portion of said second seed layer which is formed on the first thin film coil half.

In this case, the seed layers are preferably formed by sputtering. Furthermore, an electrically conductive material constituting the seed layers and thin film coils may preferably be a copper.

BRIEF DESCRIPTION OF THE DRAWINGS

FIGS. 1–8 are cross sectional views showing successive steps of a known method of manufacturing a conventional combination type thin film magnetic head;

FIGS. 9A, 9B–17A, 17B are cross sectional views illustrating successive steps of a first embodiment of the method of manufacturing the thin film magnetic head according to the invention;

FIG. 18 is a schematic plan view depicting the magnetic path length of the thin film magnetic head according to the invention in comparison with that of the conventional thin film magnetic head;

FIGS. 19A–19F are schematic views showing connecting modes of the thin film coil halves according to the invention;

FIGS. 20A and 20B are schematic plan views illustrating the arrangement of contact pads for thin film coil halves of first and second layer thin film coils and a connecting portion for coupling bottom and top poles with each other in the thin film magnetic head according to the invention;

FIGS. 21A, 21B–36A, 36B are cross sectional views showing successive steps of a second embodiment of the method of manufacturing a combination type thin film magnetic head according to the invention.

DESCRIPTION OF THE PREFERRED EMBODIMENTS

Figure 7:
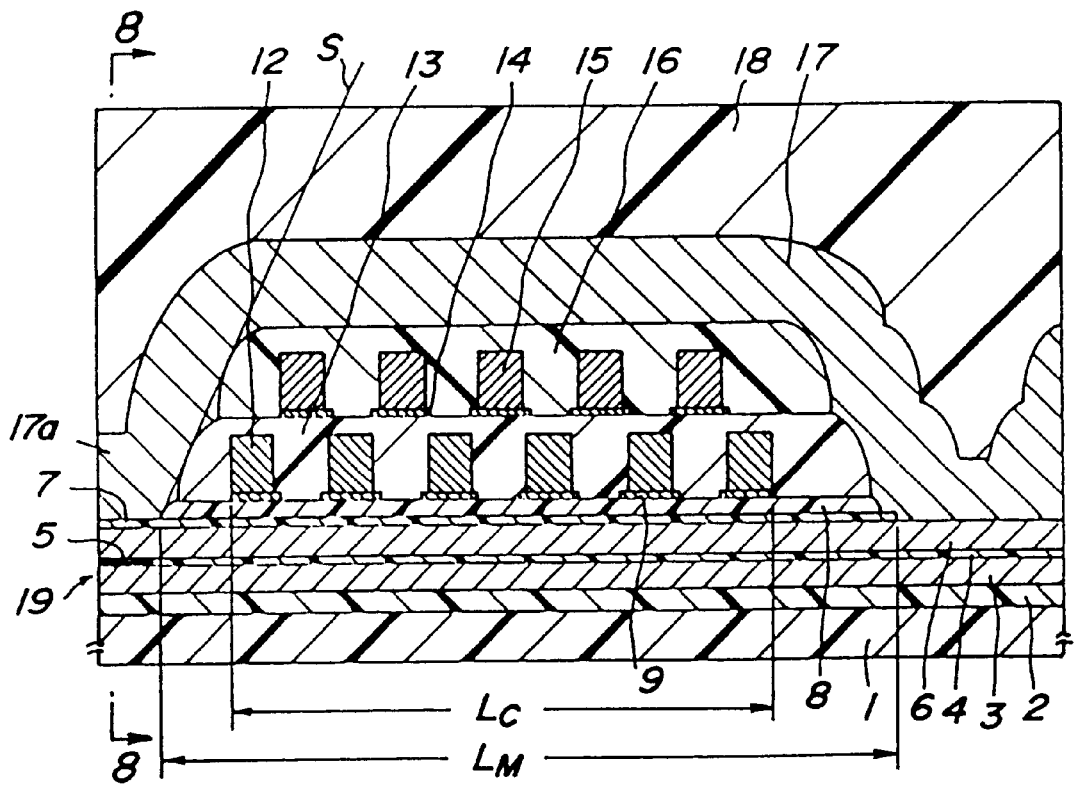
Figure 8:
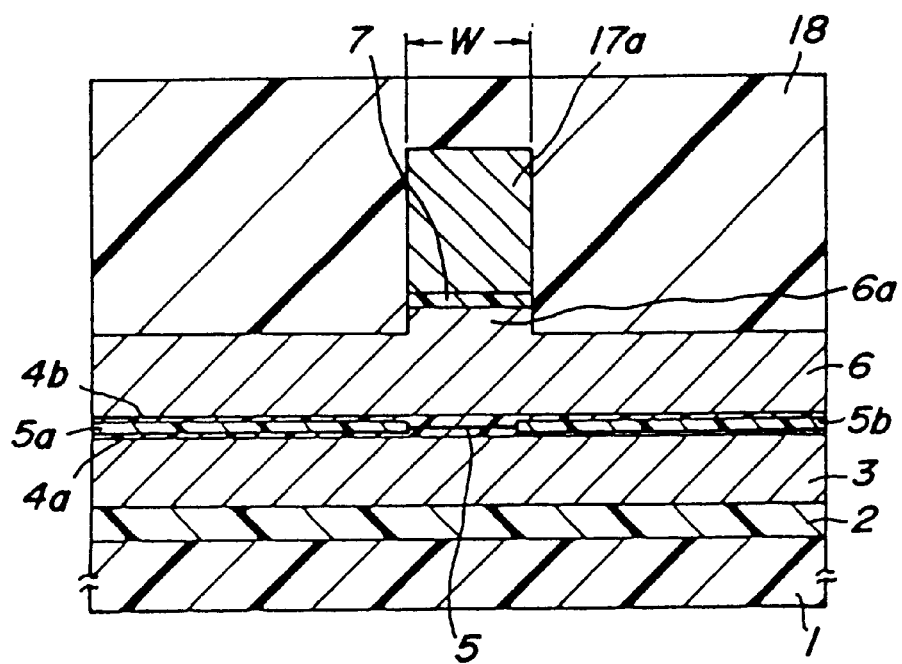

FIGS. 9–17 are cross sectional views showing successive steps of an embodiment of the method of manufacturing a thin film magnetic head according to the invention. In these figures, A denotes a cross sectional view cut along a line perpendicular to an air bearing surface and B denotes a cross sectional view cut along a line parallel with the air bearing surface side. In the present embodiment, the thin film magnetic head is constructed as a combination type thin film magnetic head, in which a magnetoresistive type thin film magnetic head and an inductive type thin film magnetic head are stacked on a substrate successively in this order.

At first, as shown in FIG. 9, an insulating layer 32 made of alumina and having a thickness of about 5 $\mu$m is formed on one surface of a substrate main body 21 made of aluminum-titanium-carbon (AlTiC), and then after forming a bottom shield layer 33 constituting a magnetic shield for protecting a GMR reproducing head from an external magnetic field and having a thickness of 2–3 $\mu$m, a bottom shield gap layer 34 made of alumina is formed to have a thickness of 0.1 $\mu$m, a GMR layer 35 constituting the GMR reproducing element is formed thereon in accordance with a given pattern by means of a highly precise mask alignment, and a top shield gap layer 36 having a thickness of 0.1 $\mu$m is formed thereon. Next, although not shown in the drawing, after forming a pair of leads for establishing an electric connection to the GMR layer 35, a first magnetic layer 37 made of a permalloy is formed to have a thickness of 2–3 $\mu$m and then a first insulating layer 38 made of alumina is formed thereon to have a thickness of 0.2–0.3 $\mu$m.

Next, as illustrated in FIG. 10, on the first insulating layer 38 is formed, by sputtering, a first seed layer 39 made of copper and having a thickness of about 0.05 μm, and a first thin film coil half 40 is formed by selectively deposing a copper on the first seed layer by performing the electroplating through a process using a photo-lithography similar to the conventional method. A width of successive coil windings of this first thin film coil half 40 is set to 2–3 μm, and a space between adjacent coil windings is set to be larger than the width.

Next, as depicted in FIG. 11, the first seed layer 39 is selectively removed by performing the plasma etching of an argon series, while the above mentioned first thin film coil half 40 is used as a mask.

Next, as illustrated in FIG. 12, after forming a second insulating layer 41 made of alumina and having a thickness of 0.025 μm, a second seed layer 42 made of a copper is formed by sputtering to have a thickness of about 0.05 μm.

Then, as shown in FIG. 13, after forming a photoresist 43, a coil-shaped recess or opening 43a is formed between successive coil windings of the above mentioned first thin film coil half 40. A width of this opening 43a is equal to a width of coil windings of second thin film coil half to be formed next.

Subsequently as shown in FIG. 14, the electroplating of a copper is carried out again to form a second thin film coil half 44 within the opening 43a formed in the photoresist 43. Then, after removing the photoresist 43 as shown in FIG. 15, a portion of the second seed layer 42 formed on successive coil windings of the first thin film coil half 40 is selectively removed, and adjacent coil windings of the second thin film coil half 44 are separated from each other. In this case, the second seed layer 42 is remained on side walls of the insulating layer 41. This does not cause any problem.

Next, as illustrated in FIG. 16, a photoresist 45 is formed in accordance with a given pattern, and after exposing a surface of a pole portion 37a of the first magnetic layer 37, a write gap layer 46 made of alumina is formed with a thickness of 0.2–0.3 μm.

Next, as shown in FIG. 17, first and second thin film coil halves 47 and 48 of a second layer thin film coil are formed above the first layer thin film coil by means of the electroplating of a copper in accordance with a similar process to that for forming the above first and second thin film coil halves 40 and 44 of the first layer thin film coil. In FIG. 17, a third seed layer 49 is formed at a bottom of the first thin film coil half 47 and a fourth seed layer 50 is formed at bottom and side of the second thin film coil half 48, and an insulating layer 51 is formed to separate the first and second thin film coil halves 47 and 48 from each other. Furthermore, above the first and second thin film coil halves 47 and 48 of the second layer thin film coil, is formed a photoresist 52 in accordance with a given pattern.

Then, after forming a second magnetic layer 53 made of permalloy and having a thickness of 2–3 μm to cover the write gap layer 46 and photoresist 52, the write gap layer is removed by performing the etching while a pole portion 53a of the second magnetic layer 53 is used as a mask, and then the first magnetic layer 37 is partially removed to form the trim structure. Then, an overcoat layer 54 made of alumina is formed to cover the second magnetic layer.

FIG. 18 is a schematic plan view showing a magnetic path length $L_I$ of the thin film magnetic head according to the invention in comparison with a magnetic path length $L_P$ of the conventional thin film magnetic head. According to the invention, as stated above, a width of the coil windings of the thin film coil halves 40, 44, 47 and 48 is identical with that of the known thin film magnetic head, but a distance between adjacent coil windings is small such as 0.3–0.5 μm, whereas in the convention head, the distance is large such as about 2 μm. Therefore, the magnetic path length $L_I$ in the thin film magnetic head according to the invention can be materially reduced to about 60% of the magnetic path length $L_P$ of the known head. In this manner, by reducing the magnetic path length, it is possible to improve the magnetic flux rising time, NLTS and over-write properties. Furthermore, since the respective thin film coil halves can be manufactured by the same process as that of the conventional method, they can be manufactured easily.

FIG. 19 represents a connecting mode of the thin film coil halves 40, 44, 47, 48 in the above embodiment. FIG. 19A shows a condition in which the first and second coil halves 40 and 44 of the first layer thin film coil are combined with each other, FIG. 19B illustrates only the first coil half 40 of the first layer thin film coil, FIG. 19C shows only the second coil half 44 of the first layer thin film coil, FIG. 19D represents a condition in which the first and second coil halves 47 and 48 of the second layer thin film coil are combined with each other, FIG. 19E shows only the first coil half 47 of the second layer thin film coil, and FIG. 19F depicts only the second coil half 48 of the second layer thin film coil.

Now it is assumed that the first and second coil halves 40 and 44 of the first layer thin film coil are wound in the clockwise direction and the first and second coil halves 47 and 48 of the second layer thin film coil are wound in the counter-clockwise direction when these coils are viewed in a direction in which a radius thereof is decreased. According to the invention, as can be understood clearly from the explanation about the manufacturing method, the first and second coil halves belonging to the same layer are wound in the same direction.

A contact pad 40-1 formed at an outer end of the first coil half 40 of the first layer thin film coil is connected to a first lead (not shown) connected to an external terminal. A contact pad 40-2 formed at an inner end of this first coil half 40 is connected to a contact pad 47-3 formed at an inner end of the first coil half 47 of the second layer thin film coil, a contact pad 47-4 formed at an outer end of this first coil half 47 is connected to a contact pad 44-5 formed at an outer end of the second coil half 44 of the first layer thin film coil, and a contact pad 44-6 formed at an inner end of this second coil half 44 is connected to a contact pad 48-7 formed at an inner end of the second coil half 48 of the second layer thin film coil. A contact pad formed at an outer end of this second coil half 48 is connected to a second lead connected to an external terminal.

By connecting the coil halves in the manner explained above, a current can be conducted through all the coil halves in the same direction by connecting the contact pads 40-1 and 48-8 across a power supply source.

According to the invention, a current may be flown from the contact pad 40-2 formed at the inner end of the first coil half of the first layer thin film coil to the contact pad 47-3 by means of the contact pads 40-1, 48-8, 48-7, 44-6, 44-5 and 47-4. In any case, when the current flow starts from the outer or inner contact pad and ends at the outer or inner contact pad.

As explained above, FIG. 19 shows schematically the winding direction and connecting mode of the thin film coil halves. In an actual thin film magnetic head, these thin film coil halves are formed to surround the connecting portion for coupling the first and second magnetic layers 37 and 53 with each other. In the present embodiment, as shown in FIG.

20A, the contact pads 40-2 and 44-6 formed at the inner ends of the first and second coil halves 40 and 44 of the first layer thin film coil are arranged side by side and a contact hole 61 for connecting the first and second magnetic layers 37 and 53 with each other is provided below the contact pads. At the same time, as illustrated in FIG. 20B, the contact pads 47-3 and 48-7 formed at the inner ends of the first and second coil halves are arranged side by side, and a contact hole 62 for connecting the first and second magnetic layers 37 and 53 is formed below the contact pads. In this case, when the coil halves are arranged such that the contact pads 40-2 and 47-3 are opposed to each other and the contact pads 44-6 and 48-7 are opposed to each other, connection between these opposing contact pads can be effected easily. In this manner, a surface area can be utilized efficiently and the miniaturization can be attained.

FIGS. 21–36 are cross sectional views showing successive steps of a second embodiment of the method of manufacturing a thin film magnetic head according to the invention. Also in these figures, A denotes a cross sectional view cut along a line perpendicular to an air bearing surface and B denotes a cross sectional view cut along a line parallel with the air bearing surface side. In the present embodiment, portions similar to those of the previous embodiment are doted by the same reference numerals and their detailed explanation is dispensed with.

FIG. 21 shows the same condition as that shown in FIG. 9 of the first embodiment, and an insulating layer 32 made of alumina and having a thickness of about 5 μm is formed on one surface of a substrate main body 31 made of aluminum-titanium-carbon (AlTiC), and then after forming a bottom shield layer 33 having a thickness of 2–3 μm, a bottom shield gap layer 34 made of alumina is formed to have a thickness of 0.1 μm, a GMR layer 35 constituting the GMR reproducing element is formed thereon in accordance with a given pattern, a top shield gap layer 36 having a thickness of 0.1 μm is formed thereon, a first magnetic layer 37 made of a permalloy is formed to have a thickness of 2–3 μm, and then a write gap layer 38 made of alumina is formed thereon to have a thickness of 0.2–0.3 μm.

Next, as illustrated in FIG. 22, after forming, on the write gap layer 38, an insulating layer 71 made of silicon oxide to have a thickness of about 1–2 μm, the insulating layer is subjected to a patterning by a selective dry etching. In this case, an edge of the insulating layer 71 made of silicon oxide on the side of the air bearing surface becomes identical with a pattern edge of the GMR layer 35, i.e. in a vicinity of the GMR height zero point. Furthermore, this edge is formed to have a profile which is inclined by an angle of 40–70°. In the present embodiment, the insulating layer 71 is made of silicon oxide, but it may be formed by annealing a photoresist at about 200° C.

Next, as depicted in FIG. 23, a pole chip 72 made of a Hi-Bs material such as NiFe and FeN is formed by plating or sputtering, and then is patterned. The pole chip 72 is formed to cover a top of the insulating layer 71. During the formation of the pole chip 72, a connecting magnetic layer 72a is formed to be coupled with the first magnetic layer 37. For this purpose, an opening has been formed in the write gap layer 38.

Next, as illustrated in FIG. 24, the ion beam etching is carried out while the pole chip 72 is used as a mask such that the write gap layer 38 is first removed and then the surface of the first magnetic layer 37 is partially removed over a depth of about 0.5 μm to form the trim structure.

Figures 25A, 25B:
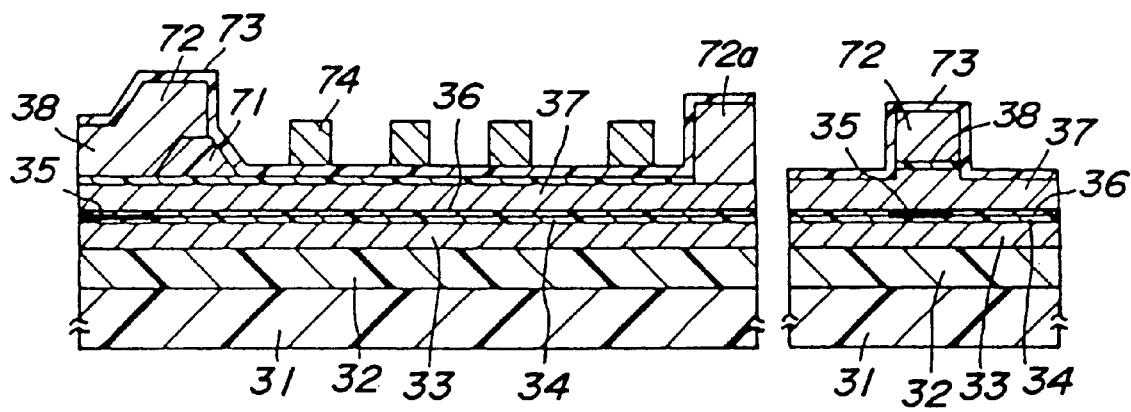

Then, as shown in FIG. 25, an insulating layer 73 made of alumina is formed with a thickness of 0.5 μm on a whole surface, and a first thin film coil half 74 of a first layer thin film coil is formed by performing the electroplating of a copper like as the previous embodiment. It should be noted that in FIG. 25, a copper seed layer formed at a bottom of the thin film coil half 74 is not shown for the sake of simplicity.

Figures 26A, 26B:
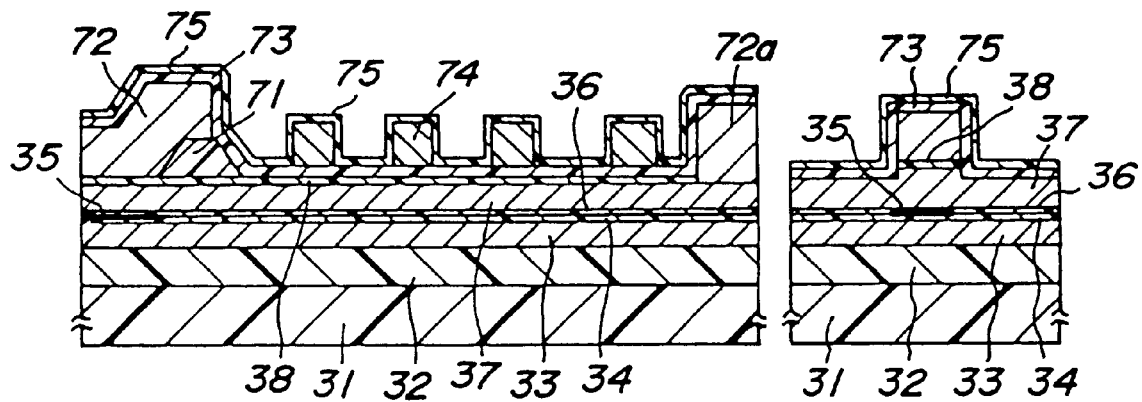
Figures 27A, 27B:
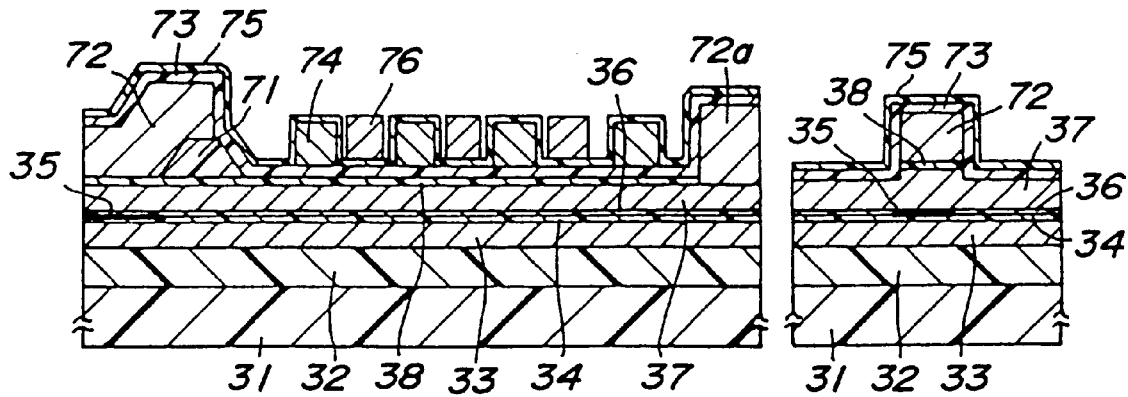

Next, as illustrated in FIG. 26, after forming an insulating layer 75 having a thickness of 0.25 μm and made of alumina which belongs to an inorganic insulating material, a second coil half 76 of the first layer tin film coil is formed by the electroplating of copper in a similar manner to that of the previous embodiment as shown in 27. The insulating layer 75 may be made of silicon oxide and silicon nitride which also belong to the inorganic insulating material. In this manner, the first layer thin film coil can be formed, in which a height of coil windings is 2–3 μm, a width of the coil windings is 1.5–2 μm, and a distance between adjacent coil windings is 0.3–0.5 μm.

Next, as shown in FIG. 28, after forming an insulating layer 77 made of alumina with a thickness of 3–5 μm, a surface is flattened by the chemical mechanical polishing (CMP) as depicted in FIG. 29. This polishing is carried out such that the top surfaces of the first and second thin film coil halves 74 and 76 of the first layer thin film coil as well as the surfaces of the pole chip 72 and connecting magnetic layer 72a are exposed.

Subsequently, as shown in FIG. 30, an insulating layer 78 made of silicon oxide belonging to the inorganic insulating material is formed with a thickness of 1–2 μm, and is shaped into a given pattern by the selective dry etching. In this case, an edge of the insulating layer 78 on a side of the air bearing surface has a profile of an inclination angle of 40–70°. Furthermore, an opening 78a is formed such that a contact pad 74a formed at an inner end of the first thin film coil half 74 of the first layer thin film coil is exposed through the opening.

Figures 31A, 31B:
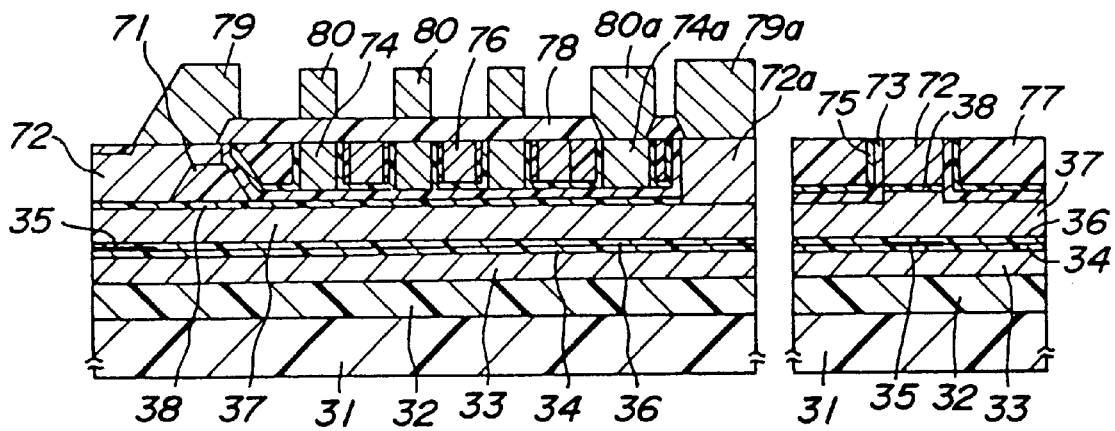

Next, as illustrated in FIG. 31, a second magnetic layer 79 constituting a part of the top pole is formed, and a first connecting magnetic layer 79a coupled with the above mentioned connecting magnetic layer 72a is formed. Further, a first thin film coil half 80 of the second layer thin film coil is formed by a similar process to that for forming the first thin film coil half 74 of the first layer thin film coil. As shown in FIG. 31, the contact pad 74a formed at an inner end of the first thin film coil half 74 of the first layer thin film coil is connected to a contact pad 80a of the first thin film coil half 80 of the second layer thin film coil.

Figures 32A, 32B:
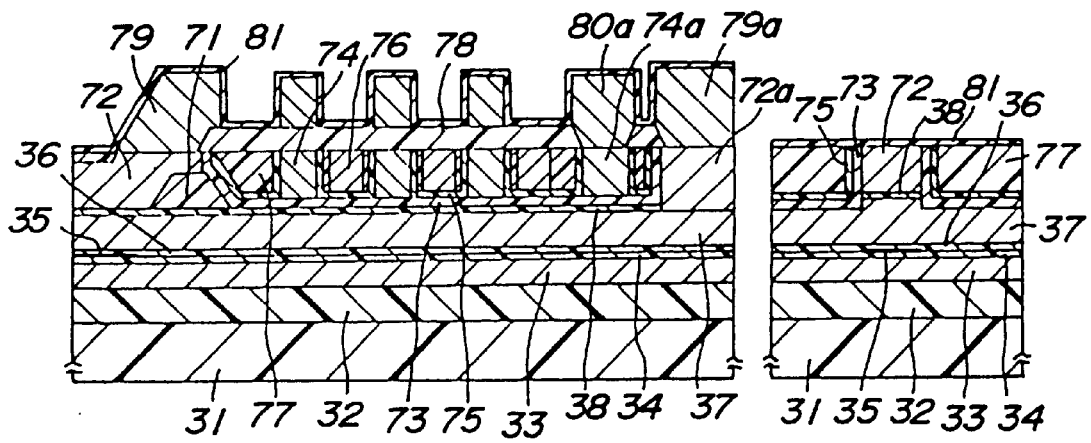
Figure 33A:
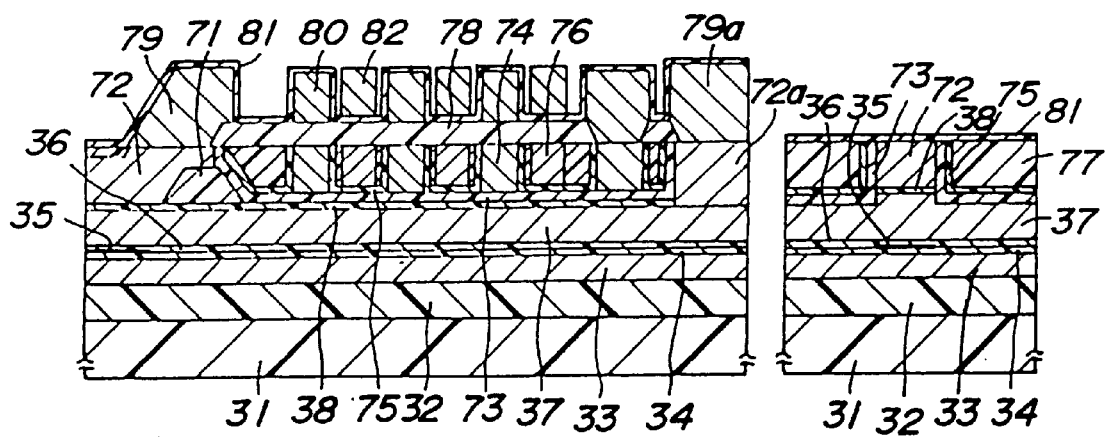
Figures 36A, 36B:
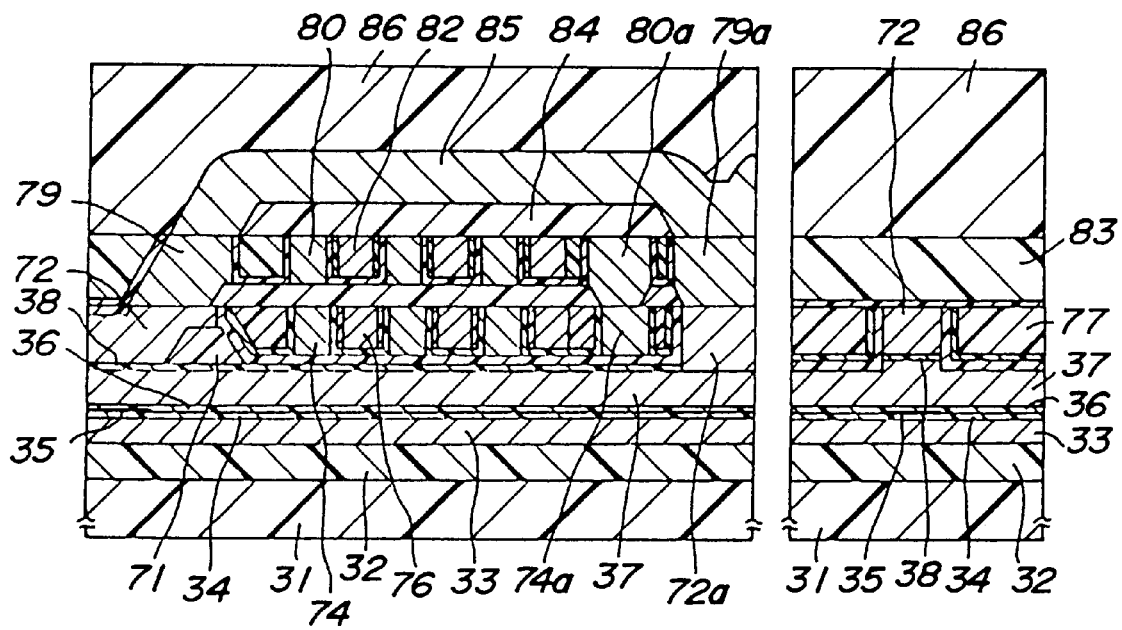

Then, as depicted in FIG. 32, after forming an insulating layer 81 made of alumina and having a thickness of 0.25 μm is formed on a whole surface, a second thin film coil half 82 of the second layer thin film coil is formed between successive coil windings of the first thin film coil half 80 of the second layer thin film coil as shown in FIG. 33.

Then, after forming an insulating layer 83 made of alumina and having a thickness of 3–5 μm on a whole surface, a surface is flattened by the CMP process as depicted in FIG. 34. In this condition, surfaces of the first and second coil halves 80 and 82 of the second layer thin film coil are exposed, and a surface of the connecting magnetic layer 80a is also exposed.

Next, as illustrated in FIG. 35, after forming a photoresist 84 on the surfaces of the first and second coil halves of the second layer thin film coil in accordance with a given pattern, a third magnetic layer 85 constituting the top pole together with said second magnetic layer 79 is formed with a thickness of about 3–5 μm. Furthermore, as shown in FIG.

36, an overcoat layer 86 is formed to cover the third magnetic layer 85.

Figure 37A:
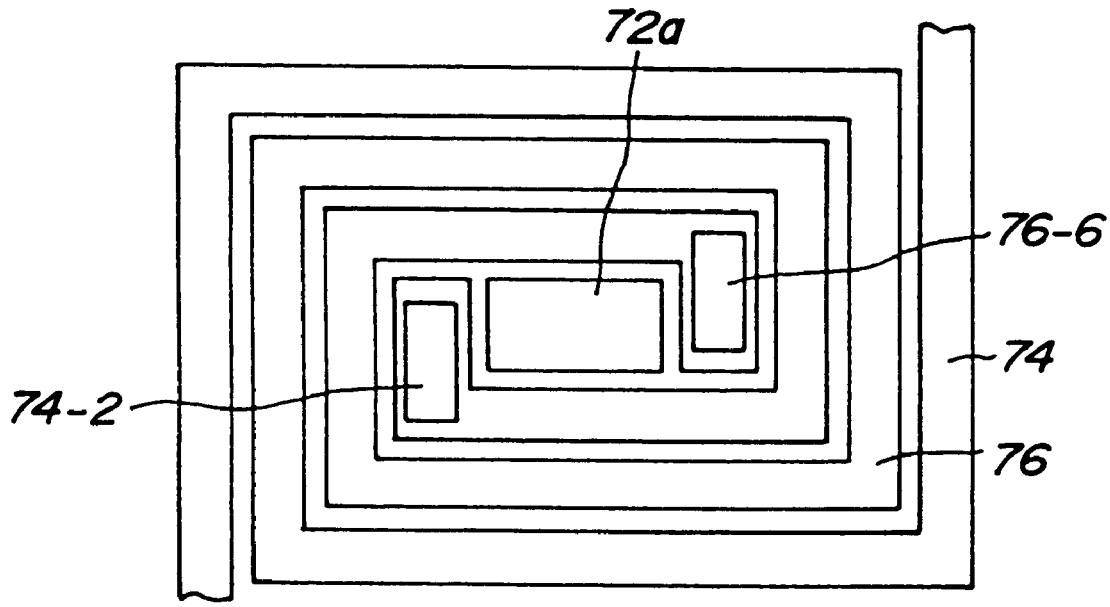
FIGS. 37A and 37B are schematic plan views depicting the arrangement of contact pads for thin film coil halves of first and second layer thin film coils and a connecting portion for coupling bottom and top poles with each other in the thin film magnetic head according to the invention.
Figure 37B:
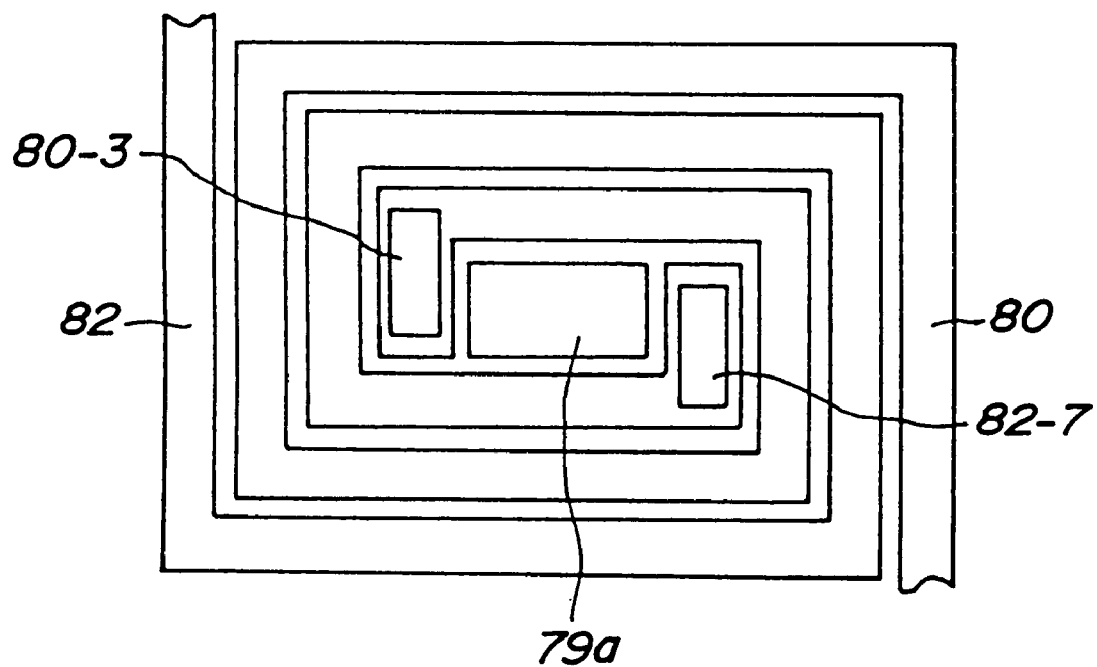

FIG. 37 shows the arrangement of contact pads formed at inner ends of the first and second coil halves of the first layer thin film coil and at the inner ends of the first and second coil halves of the second layer thin film coil. In the present embodiment, as depicted in FIG. 37A, contact pads 74-2 and 76-6 formed at inner ends of the first and second coil halves 74 and 76 of the first layer thin film coil are arranged on opposite sides of the first connecting magnetic layer 72a which couples the first magnetic layer 37 and second magnetic layer 85 with each other. As shown in FIG. 37B, contact pads 80-3 and 82-7 formed at inner ends of the first and second coil halves 80 and 82 of the second layer thin film coil are arranged on opposite sides of the second connecting magnetic layer 79a. In this case, the contact pads 74-2 and 80-3 are opposed to each other, and the contact pads 76-6 and 82-7 are opposed to each other. In the present embodiment, the contact pads 74-2, 80-3 are aligned with the contact pads 76-6, 82-7 in the direction perpendicular to the air bearing surface, but according to the invention these contact pads may be aligned in the direction parallel with the air bearing surface.

The present invention is not limited to the above explained embodiments, but many alternations and modifications may be conceived. In the above embodiment, there are provided two layer thin film coils are provided, but according to the invention, a single layer thin film coil or three layer thin film coils may be provided. Further, in the above embodiment, the reading magnetoresistive type thin film magnetic head includes the GMR layer, but a MR layer may be used. Moreover, in the above embodiments, the thin film magnetic head is constructed as the combination type thin film magnetic head by stacking the reading magnetoresistive type thin film magnetic head and the writing inductive type thin film magnetic head on the substrate, but according to the invention, only the inductive type thin film magnetic head may be provided. Furthermore, in the above embodiments, the reading magnetoresistive type thin film magnetic head is formed on the substrate, and the writing inductive type thin film magnetic head is stacked on the magnetoresistive type thin film magnetic head, but the stacking order may be reversed.

In the above mentioned thin film magnetic head according to the invention, since a distance between successive coil windings constituting the thin film coil half can be reduced as compared with the conventional magnetic head, the magnetic flux rising property, NLTS and over-write properties can be improved. Particularly, when the insulating layers formed between coil windings of the thin film coil is made of an inorganic insulating material such as silicon oxide, silicon nitride and alumina which can be easily processed by the fine machining, a distance between successive coil windings can be made extremely small such as 0.3–0.5 μm, and therefore the number of coil windings per coil layer can be increased and the NLTS property can be improved.

Moreover, according to the invention, since a distance between adjacent coil windings of the first coil halves of respective layer thin film coils can be large, the etching for removing the seed layer can be performed effectively, and debris of etched material might not be adhered to the coil windings.

Further, according to the invention, the number of coil windings in respective layer thin film coils can be increased, it is usually sufficient to provide at most three layer thin film coils. Therefore, the apex angle can be made small and the track width can be narrowed.

Moreover, in the second embodiment, the positional reference of the GMR height zero and the profile defining the apex angle are formed by the inorganic insulating layer such as silicon oxide, silicon nitride and alumina, and the pattern formed by such a material could hardly be deformed during the etching for removing the seed layer. Therefore, the GMR height and apex angle can be formed accurately to have desired design values.

What is claimed is:

1. A method of manufacturing a thin film magnetic head including;

a first magnetic layer having a pole portion which is to be opposed to a magnetic record medium;

a second magnetic layer having a pole portion which constitutes an air bearing surface together with said pole portion of the first magnetic layer, and being magnetically coupled with said first magnetic layer at a position remote from said air bearing surface;

a gap layer made of a non-magnetic material and inserted between said pole portion of the first magnetic layer and said pole portion of the second magnetic layer at least at said air bearing surface;

a thin film coil means formed by one or more layer thin film coils and having a portion which is arranged between said first and second magnetic layers by means of an insulating layer;

a substrate supporting said first and second magnetic layers, gap layer, insulating layer and thin film coil; and further comprising contact pads for inner ends of said first and second thin film coils halves located adjacent to a contact hole such that none of the contact pads is located between another contact pad and the contact hole, wherein a step of forming at least first and second layer thin film coils comprising:

the step of forming a first insulating layer such that the insulating layer is supported by said substrate;

the step of forming a first thin film coil half of the first layer thin film coil on a surface of said insulating layer into a coil fashion such that adjacent coil windings are separated from each other by a distance which is larger than a width of coil windings;

the step of forming a second thin film coil half in a coil fashion such that coil windings of the second thin film coil half are placed within spaces formed between successive coil windings of said first thin film coil half with interposing a second insulating layer between these coil windings;

the step of forming a third insulating layer over said first and second thin film coil halves;

the step of forming a first thin film coil half of the second layer thin film coil on a surface of said third insulating layer into a coil fashion such that adjacent coil windings are separated from each other by a distance which is larger than a width of coil windings, connecting an inner or outer end of said first thin film coil half of the second layer thin film coil to an inner or outer end of said first thin film coil half of said first layer thin film coil, and connecting an outer or inner end of said first thin film coil half of the second layer thin film coil to an outer or inner end of the second thin film coil half of the first layer thin film coil;

the step of forming a second thin film coil half in a coil fashion such that coil windings of the second thin film coil half are placed within spaces formed between successive coil windings of said first thin film coil half with interposing a fourth insulating layer between these coil windings, and connecting an inner or outer end of the second thin film coil half of the second layer thin film coil to an inner or outer end of the second thin film coil half of the first layer thin film coil; the step of forming a fifth insulating layer over said first and second thin film coil halves of the second layer thin film coil; and the step of forming first and second leads connected respectively to an outer or inner end of the first thin film coil half of the first layer thin film coil and to an outer or inner end of said second thin film coil half of the second layer thin film coil.

2. A method as claimed in claim 1, wherein said step of forming the first and second thin film coil halves of the first and/or second layer thin film coils comprises:

the step of forming a first seed layer on said first insulating layer;

the step of forming the first thin film coil half on said first seed layer by an electroplating;

the step of removing a portion of said first seed layer which is not covered with the first thin film coil half;

the step of forming an insulating layer over said first thin film coil half;

the step of forming a second seed layer on said insulating layer; the step of forming an insulating layer over coil windings of said first thin film coil half; the step of forming the second thin film coil half by electroplating on a portion of said second seed layer which is not covered with the insulating layer covering the coil windings of the first thin film coil half; and the step of selectively removing a portion of said second seed layer which is formed on the first thin film coil half.

3. A method as claimed in claim 2, wherein said first and second seed layers are formed by sputtering.

4. A method as claimed in claim 3, wherein said first and second seed layers and said first and second thin film coil halves are made of a same electrically conductive material.

5. A method as claimed in claim 4, wherein said electrically conductive material is copper.

6. A method as claimed in claim 2, wherein said first and second thin film coil halves are formed such that a distance between adjacent coil windings of these thin film coil halves is not longer than 1 $\mu$m.

7. A method as claimed in claim 6, wherein said distance is set to a range of 0.3–0.5 $\mu$m.

8. A method of manufacturing an inductive type writing thin film magnetic head including:

a substrate;

a first magnetic layer formed on the substrate and having a pole portion which is to be opposed to a magnetic record medium;

a second magnetic layer having pole portion which constitutes an air bearing surface together with said pole portion of the first magnetic layer and being magnetically coupled with said first magnetic layer at a position remote from said air bearing surface;

a gap layer made of a non-magnetic material and inserted between said pole portions of the first and second magnetic layers; and at least one layer thin film coil having a portion which is arranged between first and second magnetic layers, wherein said at least one thin film coil layer is formed by:

forming a first insulating layer above the first magnetic layer;

forming a first thin film coil half on the first insulating layer into a coil fashion such that adjacent coil windings of the first thin film coil half are separated from each other by a distance which is larger than a width of coil windings;

forming a second insulating layer on a whole surface;

forming a second thin film coil half on the second insulating layer into a coil fashion such that coil windings of the second thin film coil half are placed within spaces formed between successive coil windings of the first thin film coil half;

forming a third insulating layer on a whole surface, said third insulating layer having a thickness larger than a height of first and second thin film coil halves;

polishing the second and third insulating layers and the first and second thin film coil halves such that the second and third insulating layers and the first and second thin film coil halves form a coplanar flat surface; and forming a fourth insulating layer on the coplanar flat surface such that exposed surfaces of the first and second thin film coil halves are covered with the fourth insulating layer.

9. The method according to claim 8, wherein said polishing is performed by chemical mechanical polishing.

10. The method according to claim 8, wherein said first insulating layer is formed on the gap layer which is formed on the first magnetic layer.

11. The method according to claim 8, wherein said first and second thin film coil halves are formed by an electroplating of copper.

12. The method according to claim 8, wherein said second insulating layer is made of an inorganic insulating material and having a thickness not larger than 0.5 $\mu$m.

* * * * *